(12) United States Patent
Duan et al.

(10) Patent No.: US 12,719,537 B2
(45) Date of Patent: Aug. 25, 2026

(54) WAVEFORM SPECIFIC CLOSED-LOOP ANTENNA SELECTION

(71) Applicant: QUALCOMM Incorporated, San Diego, CA (US)

(72) Inventors: Weimin Duan, San Diego, CA (US); Hyojin Lee, San Diego, CA (US); Kangqi Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 18/974,540

(22) Filed: Dec. 9, 2024

(65) Prior Publication Data

US 2026/0163620 A1 Jun. 11, 2026

(51) Int. Cl.
*H04B 7/06* (2006.01)
*H04B 17/10* (2015.01)
*H04W 24/10* (2009.01)

(52) U.S. Cl.
CPC ......... *H04B 7/0608* (2013.01); *H04B 17/101* (2015.01); *H04W 24/10* (2013.01)

(58) Field of Classification Search
CPC .... H04B 7/0608; H04B 17/101; H04W 24/10
See application file for complete search history.

(56) References Cited

U.S. PATENT DOCUMENTS

2018/0324715 A1* 11/2018 Ryoo .................... H04W 72/20
2020/0100327 A1* 3/2020 Zhang .................. H04B 7/0628
2021/0281455 A1* 9/2021 Lee ..................... H04L 27/2636
2024/0014869 A1* 1/2024 Ly ........................ H04B 7/0456
2024/0333359 A1* 10/2024 Liu ...................... H04B 7/0456

FOREIGN PATENT DOCUMENTS

WO WO-2024234221 A1 11/2024

OTHER PUBLICATIONS

Huawei, et al., "General considerations on power headroom calculation and reporting", 3GPP TSG RAN WG1 Meeting #90, R1-1713770, 3rd Generation Partnership Project, Mobile Competence Centre, 650, Route Des Lucioles, F-06921, Sophia-Antipolis Cedex, France, vol. RAN WG1, No. Prague, Czech Republic, Aug. 21, 2017-Aug. 25, 2017, Aug. 20, 2017, 3 Pages, XP051316569.
International Search Report and Written Opinion—PCT/US2025/056429—ISA/EPO—Mar. 10, 2026.

* cited by examiner

*Primary Examiner* — David B Lugo
(74) *Attorney, Agent, or Firm* — Holland & Hart LLP

(57) ABSTRACT

Methods, systems, and devices for wireless communication are described. Various aspects relate to waveform specific closed-loop antenna selection. Some aspects more specifically relate to mechanisms according to which a user equipment (UE) may receive per-waveform antenna selection results from a network entity. In some examples, the UE may transmit an information report to the network entity to indicate parameters associated with a set of antennas of the UE, with the parameters including a respective set of parameters for each of multiple waveforms supported or used by the UE. For example, the parameters may include a first set of parameters associated with the set of antennas for a first waveform and a second set of parameters associated with the set of antennas for a second waveform. The UE may receive the per-waveform antenna selection results from the network entity based on the information report.

20 Claims, 18 Drawing Sheets

Figure 17:
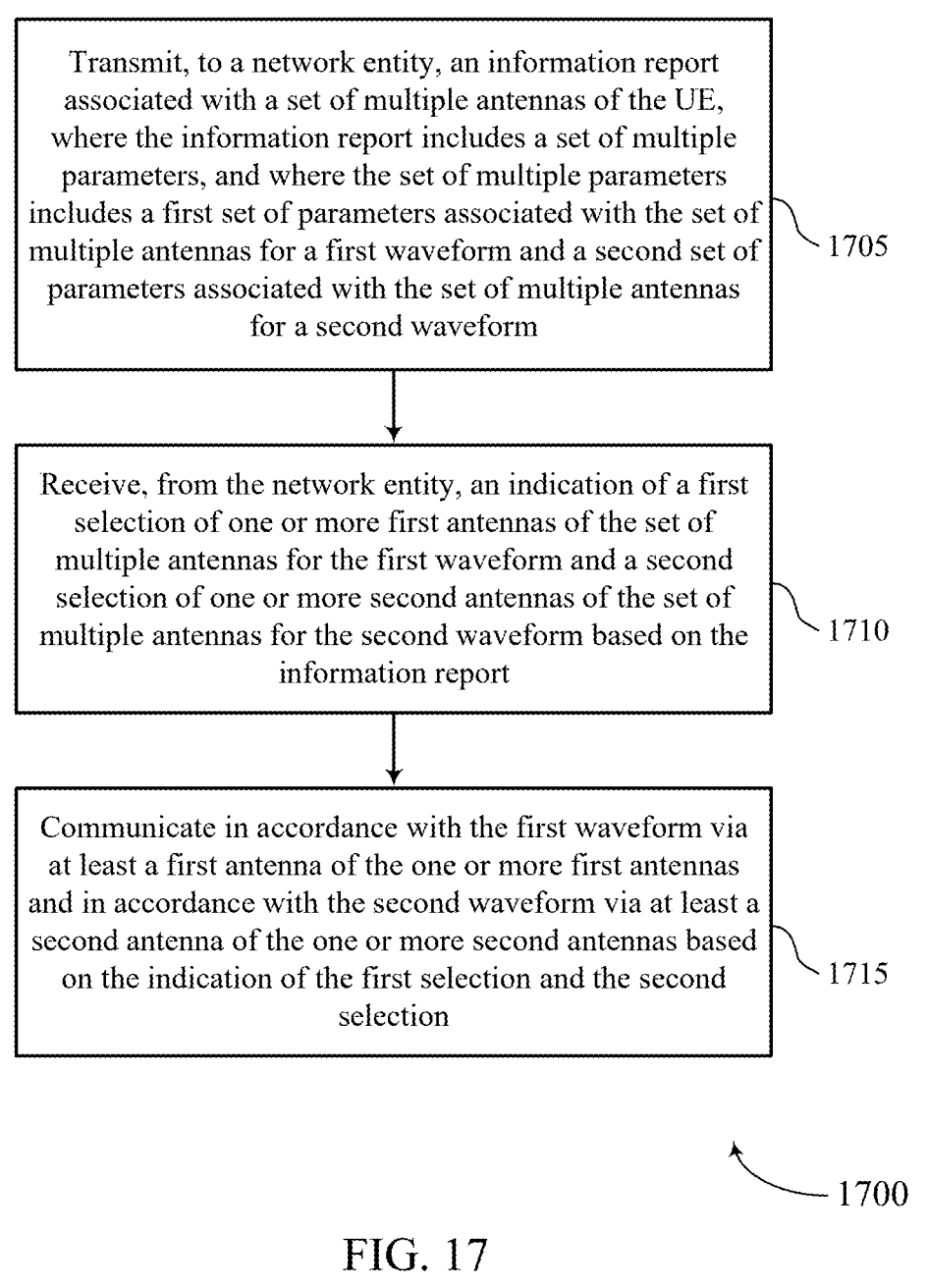

Transmit, to a network entity, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform

1705

Receive, from the network entity, an indication of a first selection of one or more first antennas of the set of multiple antennas for the first waveform and a second selection of one or more second antennas of the set of multiple antennas for the second waveform based on the information report

1710

Communicate in accordance with the first waveform via at least a first antenna of the one or more first antennas and in accordance with the second waveform via at least a second antenna of the one or more second antennas based on the indication of the first selection and the second selection

Figure 18:
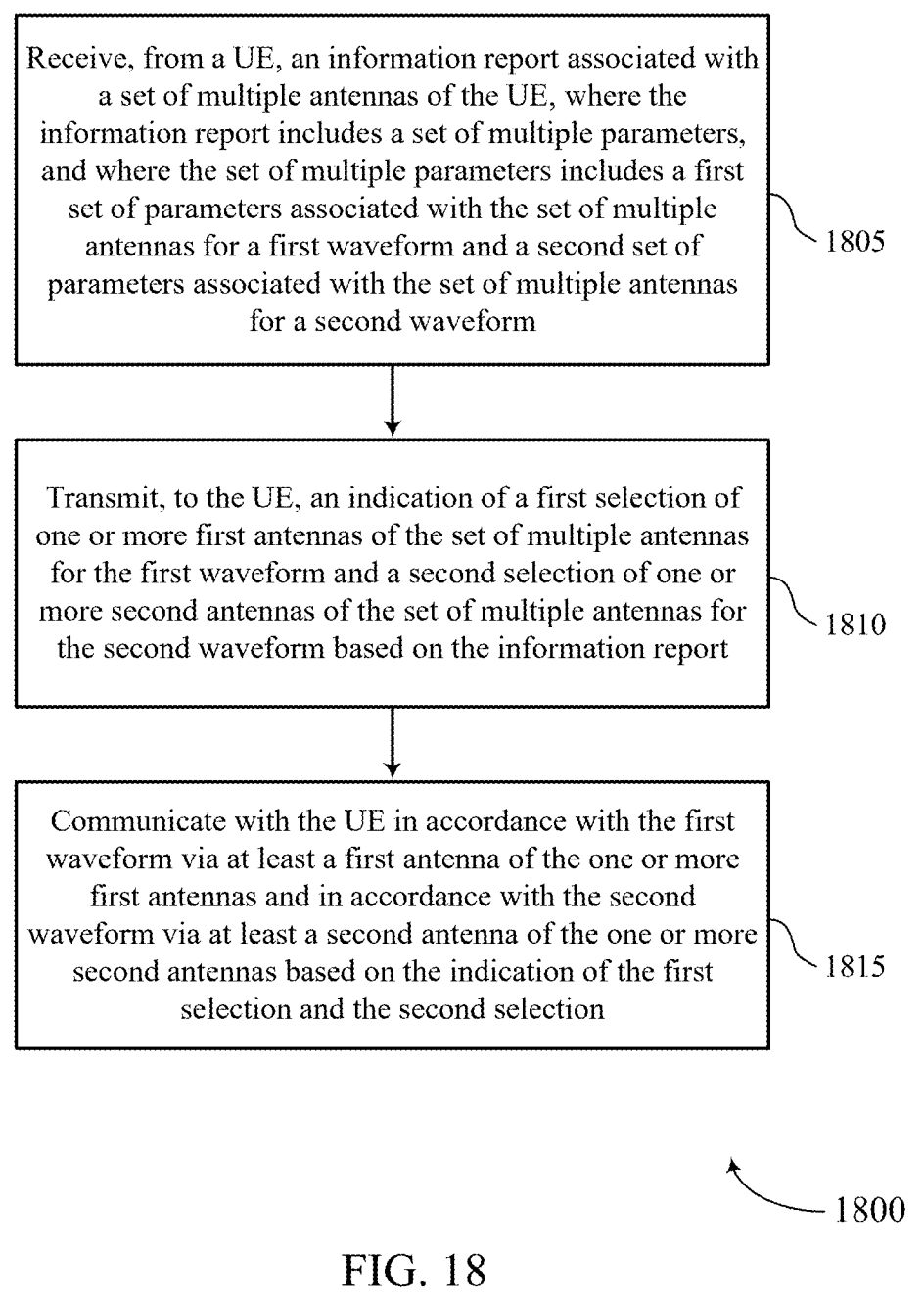

Receive, from a UE, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform

1805

Transmit, to the UE, an indication of a first selection of one or more first antennas of the set of multiple antennas for the first waveform and a second selection of one or more second antennas of the set of multiple antennas for the second waveform based on the information report

1810

Communicate with the UE in accordance with the first waveform via at least a first antenna of the one or more first antennas and in accordance with the second waveform via at least a second antenna of the one or more second antennas based on the indication of the first selection and the second selection

WAVEFORM SPECIFIC CLOSED-LOOP ANTENNA SELECTION

FIELD OF TECHNOLOGY

The following relates to wireless communication, including waveform specific closed-loop antenna selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may support or operate multiple antennas for communication between the UE and a base station. For example, the UE may support a set of antennas and may communicate with (e.g., transmit signaling to or receive signaling from) the base station via one or more antennas of the set of antennas. Further, in some cases, the UE may be capable of switching between antennas over time. For example, the UE may use a first set of one or more antennas for communication with the base station within a first time period and may use a second set of one or more antennas for communication with the base station within a second time period. In some systems, the UE may autonomously select (or switch to) one or more antennas in accordance with a criterion, such as a transmit power budget, at the UE.

SUMMARY

The systems, methods, and devices of this disclosure each have several innovative aspects, no single one of which is solely responsible for the desirable attributes disclosed herein.

A method for wireless communications by a UE is described. The method may include transmitting, to a network entity, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform, receiving, from the network entity, an indication of a first selection of one or more first antennas of the set of multiple antennas for the first waveform and a second selection of one or more second antennas of the set of multiple antennas for the second waveform based on the information report, and communicating with the network entity in accordance with the first waveform via at least a first antenna of the one or more first antennas and in accordance with the second waveform via at least a second antenna of the one or more second antennas based on the indication of the first selection and the second selection.

A UE for wireless communications is described. The UE may include one or more memories storing processor executable code, and one or more processors coupled with the one or more memories. The one or more processors may individually or collectively be operable to execute the code to cause the UE to transmit, to a network entity, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform, receive, from the network entity, an indication of a first selection of one or more first antennas of the set of multiple antennas for the first waveform and a second selection of one or more second antennas of the set of multiple antennas for the second waveform based on the information report, and communicate with the network entity in accordance with the first waveform via at least a first antenna of the one or more first antennas and in accordance with the second waveform via at least a second antenna of the one or more second antennas based on the indication of the first selection and the second selection.

Another UE for wireless communications is described. The UE may include means for transmitting, to a network entity, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform, means for receiving, from the network entity, an indication of a first selection of one or more first antennas of the set of multiple antennas for the first waveform and a second selection of one or more second antennas of the set of multiple antennas for the second waveform based on the information report, and means for communicating with the network entity in accordance with the first waveform via at least a first antenna of the one or more first antennas and in accordance with the second waveform via at least a second antenna of the one or more second antennas based on the indication of the first selection and the second selection.

A non-transitory computer-readable medium storing code for wireless communications is described. The code may include instructions executable by one or more processors to transmit, to a network entity, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform, receive, from the network entity, an indication of a first selection of one or more first antennas of the set of multiple antennas for the first waveform and a second selection of one or more second antennas of the set of multiple antennas for the second waveform based on the information report, and communicate with the network entity in accordance with the first waveform via at least a first antenna of the one or more first antennas and in accordance with the second waveform via at least a second antenna of the one or more second antennas based on the indication of the first selection and the second selection.

In some examples of the method, UEs, and non-transitory computer-readable medium described herein, the first set of parameters includes a first set of power headroom (PHR) values, each PHR value of the first set of PHR values corresponding to a respective antenna of the set of multiple antennas and being associated with the first waveform and the second set of parameters includes a second set of PHR values, each PHR value of the second set of PHR values corresponding to the respective antenna of the set of multiple antennas and being associated with the second waveform.

In some examples of the method, UEs, and non-transitory computer-readable medium described herein, transmitting the information report associated with the set of multiple antennas may include operations, features, means, or instructions for transmitting a set of multiple per-antenna per-waveform PHR values, where the set of multiple parameters includes the set of multiple per-antenna per-waveform PHR values.

In some examples of the method, UEs, and non-transitory computer-readable medium described herein, transmitting the information report associated with the set of multiple antennas may include operations, features, means, or instructions for transmitting a set of multiple per-antenna per-channel PHR values, where the UE may be capable of communication via a set of multiple channels, where each channel of the set of multiple channels may be associated with a respective waveform of a set of multiple waveforms including the first waveform and the second waveform, and where the set of multiple parameters includes the set of multiple per-antenna per-channel PHR values.

In some examples of the method, UEs, and non-transitory computer-readable medium described herein, transmitting the information report associated with the set of multiple antennas may include operations, features, means, or instructions for transmitting a set of multiple per-antenna per-reference signal PHR values, where the UE may be capable of transmission of a set of multiple reference signals, where each reference signal of the set of multiple reference signals may be associated with a respective waveform of a set of multiple waveforms including the first waveform and the second waveform, and where the set of multiple parameters includes the set of multiple per-antenna per-reference signal PHR values.

In some examples of the method, UEs, and non-transitory computer-readable medium described herein, transmitting the information report associated with the set of multiple antennas may include operations, features, means, or instructions for transmitting a set of multiple per-antenna per-usage PHR values, where the UE may be capable of communication in accordance with a set of multiple usages, where each usage of the set of multiple usages may be associated with a respective waveform of a set of multiple waveforms including the first waveform and the second waveform, and where the set of multiple parameters includes the set of multiple per-antenna per-usage PHR values.

Some examples of the method, UEs, and non-transitory computer-readable medium described herein may further include operations, features, means, or instructions for receiving, from the network entity, control signaling indicative of a set of multiple sounding reference signal (SRS) resource configurations, where the set of multiple SRS resource configurations includes a first SRS resource configuration associated with the first waveform and a second SRS resource configuration associated with the second waveform and transmitting, to the network entity via each antenna of at least a subset of the set of multiple antennas of the UE, a first respective set of SRSs in accordance with the first SRS resource configuration and a second respective set of SRSs in accordance with the second SRS resource configuration.

In some examples of the method, UEs, and non-transitory computer-readable medium described herein, receiving the indication of the first selection and the second selection may include operations, features, means, or instructions for receiving per-waveform antenna selection results.

In some examples of the method, UEs, and non-transitory computer-readable medium described herein, receiving the indication of the first selection and the second selection may include operations, features, means, or instructions for receiving per-channel antenna selection results, where the UE may be capable of communication via a set of multiple channels, and where each channel of the set of multiple channels may be associated with a respective waveform of a set of multiple waveforms including the first waveform and the second waveform.

In some examples of the method, UEs, and non-transitory computer-readable medium described herein, receiving the indication of the first selection and the second selection may include operations, features, means, or instructions for receiving per-reference signal antenna selection results, where the UE may be capable of transmission of a set of multiple reference signals, and where each reference signal of the set of multiple reference signals may be associated with a respective waveform of a set of multiple waveforms including the first waveform and the second waveform.

In some examples of the method, UEs, and non-transitory computer-readable medium described herein, receiving the indication of the first selection and the second selection may include operations, features, means, or instructions for receiving per-usage antenna selection results, where the UE may be capable of communication in accordance with a set of multiple usages, and where each usage of the set of multiple usages may be associated with a respective waveform of a set of multiple waveforms including the first waveform and the second waveform.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 17 and 18 show flowcharts illustrating methods that support waveform specific closed-loop antenna selection in accordance with one or more aspects of the present disclosure.

DETAILED DESCRIPTION

Figure 1:
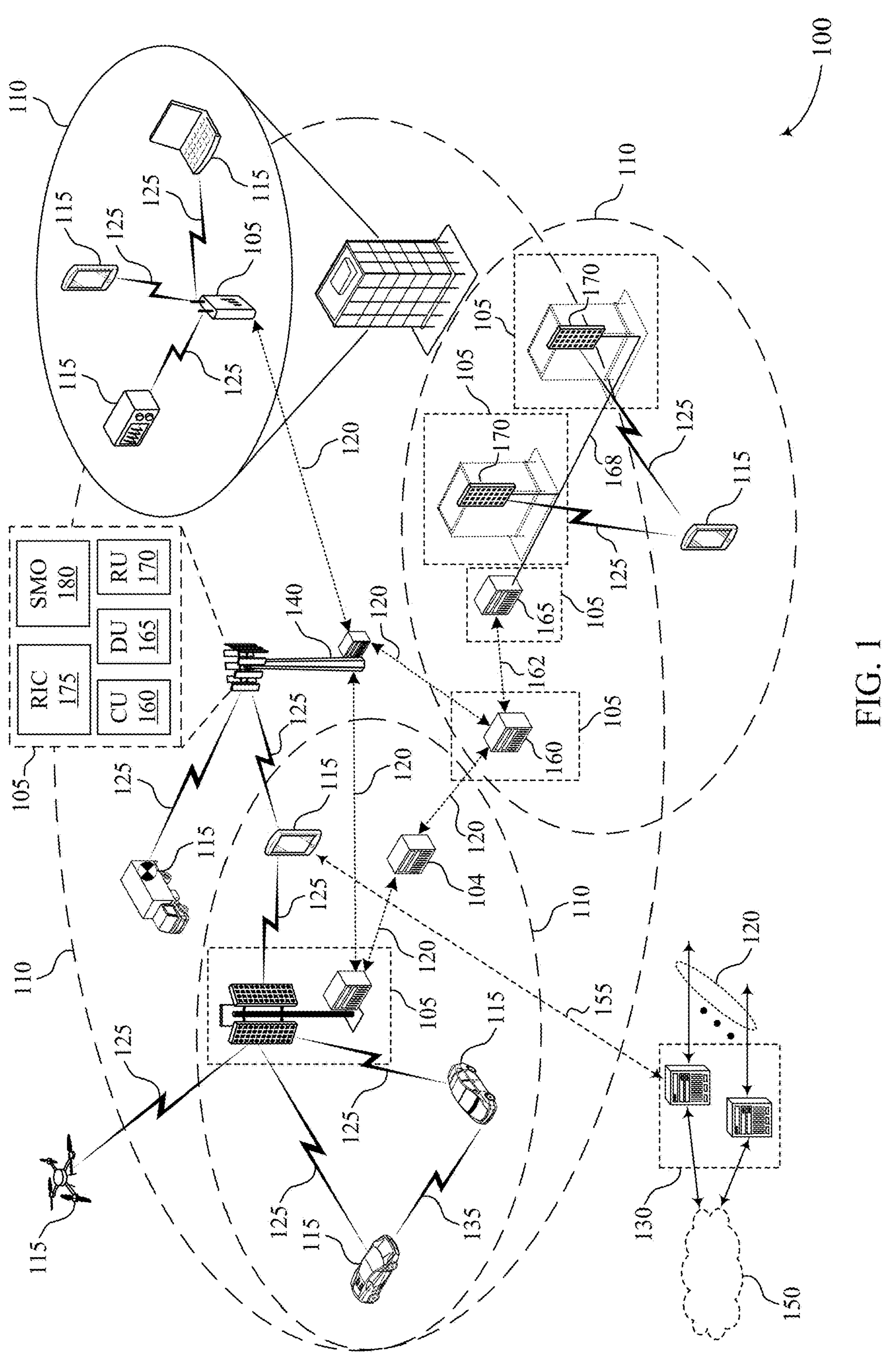
FIG. 1 shows an example of a wireless communications system that supports waveform specific closed-loop antenna selection in accordance with one or more aspects of the present disclosure.

In some wireless communication systems, a UE may support or operate multiple antennas for communication between the UE and another wireless device, such as a network entity or another UE. For example, the UE may support a set of antennas and may communicate with (e.g., transmit signaling to or receive signaling from) the other wireless device via one or more antennas of the set of antennas. Further, in some cases, the UE may be capable of switching between antennas over time. For example, the UE may use a first set of one or more antennas within a first time period and may use a second set of one or more antennas within a second time period. In some systems, the UE may autonomously select (or switch to) one or more antennas in accordance with a criterion, such as a transmit power budget or an overall propagation channel between the UE and the other wireless device. In some other systems, the UE and the network entity may support a signaling-based antenna selection mechanism according to which the UE may receive, from the network entity, information associated with an antenna selection at the UE. For example, the UE and the network entity may support a closed-loop antenna selection mechanism involving signaling between the UE and the network entity.

Such closed-loop antenna selection mechanisms may consider parameters associated with frequency division duplexing (FDD), supplementary uplink (SUL), or scenarios involving an uplink reception point separate from a downlink transmission point as, for example, the network entity may have relatively more information pertaining to or control of such parameters (as compared to the UE). In some cases, however, such closed-loop antenna selection mechanisms may fail to consider some other aspects associated with communication by UE that may impact one or more antenna selection factors. For example, such closed-loop antenna selection mechanisms may fail to consider impacts associated with different uplink waveforms, channels, reference signals, or device usages, which may at least partially influence per-antenna power budgets at the UE. Thus, systems that support multiple waveforms or multiple transmission schemes across different channels, reference signals, or device usages may benefit from antenna selection mechanisms that account for such multiple waveforms or multiple transmission schemes.

Various aspects generally relate to waveform specific closed-loop antenna selection. Some aspects more specifically relate to one or more configuration- or signaling-based mechanisms according to which a UE may receive per-waveform antenna selection results from a network entity. In other words, in accordance with some example implementations, the UE may support a closed-loop antenna selection on a per-waveform basis. In some examples, the UE may transmit an information report to the network entity to indicate parameters associated with a set of antennas of the UE, with the parameters including a respective set of parameters for each waveform of multiple waveforms supported or used by the UE. For example, the parameters may include a first set of parameters associated with the set of antennas for a first waveform and a second set of parameters associated with the set of antennas for a second waveform. The UE may indicate such waveform specific parameters as or on a basis of per-antenna per-waveform PHR values, per-antenna per-channel PHR values, per-antenna per-reference signal PHR values, per-antenna per-usage PHR values, or any combination thereof.

In accordance with receiving the information report from the UE, the network entity may transmit an indication of multiple antenna selections to the UE. For example, the network entity may indicate a respective antenna selection for each waveform of the multiple waveforms supported or used by the UE. By way of further example, the network entity may transmit, to the UE and based on the information report, an indication of a first selection of one or more first antennas for the first waveform and a second selection of one or more second antennas for the second waveform. The UE may communicate in accordance with the antenna selections indicated by the network entity. For example, the UE may communicate in accordance with the first waveform via at least a first antenna of the one or more first antennas and may communicate in accordance with the second waveform via at least a second antenna of the one or more second antennas based on the indication of the first selection and the second selection. Such communication by the UE may include communication between the UE and the network entity, communication between the UE and another wireless device, continuous wave (CW) transmissions, communication of radio frequency (RF) sensing signaling, or communication of UE positioning signaling, among other examples. As used herein, "communication" may refer to one or both of transmission and reception.

Particular aspects of the subject matter described herein may be implemented to realize one or more of the following advantages. For example, by supporting waveform specific closed-loop antenna selection, the UE and the network entity may be better equipped to address, handle, accommodate, or leverage different precoders and different transmission power budgets per-antenna across different waveform types, which may provide greater communication reliability and more efficient use of hardware resources at the UE. Further, by achieving greater communication reliability as part of accounting for different transmission power budgets per-antenna across different waveform types, the described techniques may be implemented to support higher spectrum efficiency by enabling the UE to flexibly or dynamically use different antennas on an at least partially waveform dependent basis (which may enable the UE to use a greater or more suitable transmit power). Additionally, by supporting and leveraging an information report that provides antenna selection related information on a per-waveform, per-channel, per-reference signal, or per-usage basis, the UE may enable the network entity to consider waveform, channel, reference signal, or usage specific factors as part of a closed-loop antenna selection, which may further support higher spectrum efficiency and greater device coordination while maintaining relatively low signaling overhead. Likewise, by supporting and leveraging network entity-provided antenna selection results that convey a respective antenna selection for each waveform of the multiple waveforms (or each channel, reference signal, or usage of multiple channels, reference signals, or usages) supported or used by the UE, the UE and the network entity may further support higher spectrum efficiency and greater device coordination, along with relatively low signaling overhead. In accordance with such higher spectrum efficiency, greater communication reliability, more efficient use of hardware resources, greater coordination, and relatively low signaling overhead, the described techniques may be further implemented to realize or facilitate higher data rates and greater system capacity, among other benefits.

Aspects of the disclosure are initially described in the context of wireless communications systems. Additionally, aspects of the disclosure are illustrated by and described with reference to an antenna selection, a signaling diagram, example information reports, and a process flow. Aspects of the disclosure are further illustrated by and described with reference to apparatus diagrams, system diagrams, and flowcharts that relate to waveform specific closed-loop antenna selection.

FIG. 1 shows an example of a wireless communications system 100 that supports waveform specific closed-loop antenna selection in accordance with one or more aspects of the present disclosure. The wireless communications system 100 may include one or more devices, such as one or more network devices (e.g., network entities 105), one or more UEs 115, and a core network 130. In some examples, the wireless communications system 100 may be an LTE network, an LTE-A network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., an RF access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support waveform specific closed-loop antenna selection as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples. The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term “carrier” may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both FDD and time division duplexing (TDD) component carriers. Communication between a network entity 105 and other devices may refer to communication between the devices and any portion (e.g., entity, sub-entity) of a network entity 105. For example, the terms “transmitting,” “receiving,” or “communicating,” when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

One or more wireless communication devices of the wireless communications system 100 may support waveform specific closed-loop antenna selection. For example, a UE 115 may select one or more antennas in accordance with a waveform used by the UE 115 and in accordance with signaling between the UE 115 and a network entity 105. In other words, the UE 115 may support a closed-loop antenna selection on a per-waveform basis. In some aspects, the UE 115 may transmit an information report to a network entity 105 to indicate parameters associated with a set of antennas of the UE 115, with the parameters including a respective set of parameters for each waveform of multiple waveforms supported or used by the UE 115. For example, the parameters may include a first set of parameters associated with the set of antennas for a first waveform and a second set of parameters associated with the set of antennas for a second waveform. The UE 115 may indicate such waveform specific parameters as or on a basis of per-antenna per-waveform PHR values, per-antenna per-channel PHR values, per-antenna per-reference signal PHR values, per-antenna per-usage PHR values, or any combination thereof.

In association with receiving the information report from the UE 115, the network entity 105 may transmit an indication of multiple antenna selections to the UE 115. For example, the network entity 105 may indicate a respective antenna selection for each waveform of the multiple waveforms supported or used by the UE 115. By way of further example, the network entity 105 may transmit, to the UE 115 and based on the information report, an indication of a first selection of one or more first antennas for the first waveform and a second selection of one or more second antennas for the second waveform. The UE 115 may communicate in accordance with the antenna selections indicated by the network entity 105. For example, the UE 115 may communicate in accordance with the first waveform via at least a first antenna of the one or more first antennas and may communicate in accordance with the second waveform via at least a second antenna of the one or more second antennas based on the indication of the first selection and the second selection.

Additionally, or alternatively, the UE 115 may indicate, via one or more information reports, one or more of per-antenna per-waveform PHR values, per-antenna per-channel PHR values, per-antenna per-reference signal PHR values, and per-antenna per-usage PHR values each on a standalone or independent basis. For example, the UE 115 may indicate per-antenna per-waveform PHR values, may separately indicate per-antenna per-channel PHR values, may separately indicate per-antenna per-reference signal PHR values, and/or may separately indicate per-antenna per-usage PHR values via one or more information reports. In such examples, the UE 115 and the network entity 105 may support one or more of waveform specific closed-loop antenna selection, channel specific closed-loop antenna selection, reference signal specific closed-loop antenna selection, and usage specific closed-loop antenna selection. For example, instead of, or in addition to, indicating a respective antenna selection on a per-waveform basis, the network entity 105 may indicate a respective antenna selection on one or more of a per-channel basis, a per-reference signal basis, and a per-usage basis.

Figure 2:
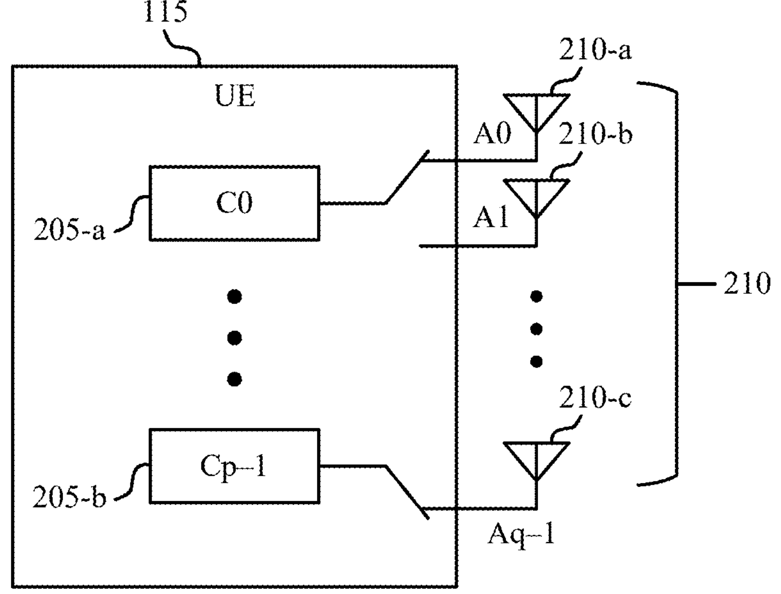
FIG. 2 shows an example of an antenna selection that supports waveform specific closed-loop antenna selection in accordance with one or more aspects of the present disclosure.

FIG. 2 shows an example of an antenna selection 200 that supports waveform specific closed-loop antenna selection in accordance with one or more aspects of the present disclosure. In some aspects, a UE 115 (e.g., a UE 115 as illustrated by and described with reference to FIG. 1) may implement the antenna selection 200 to select one or more antennas to use for communication (e.g., transmission or reception of one or more signals).

The UE 115 may support or operate a set of communication chains (which may be understood as RF chains, transmit chains, receive chains, or transmit and receive chains) including a communication chain 205-*a* and a communication chain 205-*b*. As illustrated in the example of the antenna selection 200, the communication chain 205-*a* may be denoted as a communication chain "CO," and the communication chain 205-*b* may be denoted as a communication chain "Cp-1." In such examples, "p" may be indicative of a total quantity of communication chains supported or operated by the UE 115, with "p" being any numeric quantity such as one, two, three, four, five, or six, among other examples. Additionally, the UE 115 may support or operate a set of antennas 210 including an antenna 210-*a*, an antenna 210-*b*, and an antenna 210-*c*. As illustrated in the example of the antenna selection 200, the antenna 210-*a* may be denoted as an antenna "A0," the antenna 210-*b* may be denoted as an antenna "A1," and the antenna 210-*c* may be denoted as an antenna "Aq-1." In such examples, "q" may be indicative of a total quantity of antennas supported or operated by the UE 115, with "q" being any numeric quantity such as one, two, three, four, five, or six, among other examples.

In some aspects (e.g., for uplink communication), the UE 115 may have a smaller quantity of transmit chains (which may be indicative of a maximum or upper limit quantity of baseband layers) than antennas. For example, "p" may be less than "q." Such extra antennas (which may have a quantity equal to "q" minus "p") may be available for receive purposes (as, for example, more receive chains may be employed than transmit chains). In examples in which the UE 115 supports or operates "p" communication (e.g., transmit) chains and "q" antennas, the UE 115 may be understood as having a capability of "pCqA" (e.g., "p" Chains and "q" Antennas).

In accordance with the antenna selection 200, the UE 115 may map, connect, or route a communication chain to an antenna of the set of antennas 210 and may be capable of switching the connection from chains to antennas over time. In some aspects, the UE 115 may map, connect, or route a communication chain to an antenna of the set of antennas 210 in accordance with one or more factors (e.g., to use a set of one or more antennas that provides a greatest signal strength or communication reliability). Such factors may include one or both of a per-antenna transmit power budget and an overall propagation channel from the UE 115 to another (transmitting or receiving) device, such as a network entity 105. For example, an antenna selection factor may include an overall propagation channel from a baseband of the UE 115 to a baseband of a network entity 105 (e.g., a gNB).

In some aspects, the UE 115 may calculate, determine, identify, or otherwise select a decomposition of an uplink MIMO channel for "p" uplink transmit chains to "M" network-side transmit and receive units (TRUs) in accordance with Equations 1-4, shown below. The UE 115 may use such a decomposition of the uplink MIMO channel as part of the antenna selection 200 (e.g., to select one or more antennas to use for communication with a network entity 105).

$$H_{UL} = J \cdot PL \cdot E^{BS\left(\frac{1}{2}\right)} H_w R^{UE\left(\frac{H}{2}\right)} IPW \tag{1}$$

$$J = \begin{bmatrix} J_0 & \cdots & 0 \\ \vdots & \ddots & \vdots \\ 0 & \cdots & J_{N-1} \end{bmatrix} \tag{2}$$

$$I = \begin{bmatrix} I_0 & \cdots & 0 \\ \vdots & \ddots & \vdots \\ 0 & \cdots & I_{p-1} \end{bmatrix} \tag{3}$$

$$P = \begin{bmatrix} \sqrt{P_0} & \cdots & 0 \\ \vdots & \ddots & \vdots \\ 0 & \cdots & \sqrt{P_{p-1}} \end{bmatrix} \tag{4}$$

In the example of the decomposition of the uplink MIMO channel shown by Equations 1-4, J may be a matrix associated with or indicative of a network entity insertion loss, PL may be associated with or indicative of a channel propagation loss from the UE 115 to the network entity 105, $$R^{BS\left(\frac{1}{2}\right)}$$

may be associated with or indicative of a network entity (or, "base station" (BS)) receive antenna correlation, $H_w$ may be associated with or indicative of an uncorrelated fast fading channel component (which may, for example, be expanded as $$E\left(h_i h_j^H\right) = \frac{1}{p}\delta_{(i-j)}I,$$

and which may not be reciprocal in FDD), $$R^{UE\left(\frac{H}{2}\right)}$$

may be associated with or indicative of a UE transmit antenna correlation, I may be a matrix associated with or indicative of a UE insertion loss, P may be a matrix associated with or indicative of an uplink transmit power, and W may be associated with or indicative of a precoding matrix.

In some systems, the UE 115 may support an open-loop antenna selection according to which the UE 115 may autonomously select one or more antennas for communication (e.g., with a network entity 105). In such systems, the UE 115 may select the one or more antennas based on downlink measurements and in accordance with assuming some level of reciprocity between uplink and downlink. In some cases, however, there may be limitations in open-loop uplink antenna selection due to a mismatch (e.g., a lack or absence of reciprocity) between uplink and downlink. Such cases may include cases associated with or otherwise involving FDD, SUL, or a separate uplink reception point other than (and potentially non-collocated with) a downlink transmission point, among other cases associated with a lack of or unreliable reciprocity between uplink and downlink.

In such cases, for example, the insertion losses (associated with or indicated by I and J) and the antenna correlations ($R^{UE}$ and $R^{BS}$) may not be reciprocal (if uncalibrated between uplink and downlink) and may involve difficulties associated with determining individual values (with, for example, such difficulties caused in part by the lack of reciprocity). If the network entity 105 is calibrated, J and $R^{BS}$ may be reciprocal. In some cases, however, there may still be difficulties associated with getting or obtaining uplink/downlink calibration at the UE side, such that I and $R^{UE}$ may still not be reciprocal. In accordance with such aspects, uplink measurements may be more effective for antenna selection than downlink measurements.

Further, regarding the uplink transmit power matrix P, a maximum or upper limit transmit power (subject to maximum permissible reduction (MPR) and specific absorption rate (SAR) values) for each transmit antenna may be unknown to the network entity 105. Likewise, individual components of the uplink transmit power matrix P ($P_i$, i=0, . . . , p−1) may be unknown to the network entity 105. Therefore, an exact or accurate (at least to a threshold accuracy) budget to achieve a maximum or upper limit power for each transmit antenna (e.g., a per-antenna PHR) may be unknown to the network entity 105. In accordance with such aspects, UE per-antenna power information may assist in closed-loop antenna selection.

In accordance with uplink measurements potentially being more effective for antenna selection than downlink measurements and in accordance with a network entity 105 not having sufficient information associated with (e.g., knowledge of) the uplink transmit power matrix P at a UE 115, some systems may support closed-loop antenna selection involving signaling between a UE 115 and a network entity 105 to determine a suitable antenna selection for the UE 115. For example, while some systems may support uplink antenna selection determinations by a UE 115 in an open-loop manner (e.g., transparent to a network entity 105), some other systems may support closed-loop antenna selection according to which a UE 115 may provide information to a network entity 105 and according to which the network entity 105 may use the provided information to perform (at least a portion of) an antenna selection for the UE 115. In some aspects, closed-loop antenna selection may support relatively more flexible, dynamic, and efficient antenna selection as compared to open-loop antenna selection.

Some closed-loop antenna selection mechanisms may not fully or sufficiently consider some communication or network aspects, such as impacts from different uplink waveforms, channels, reference signals, or usages, each of which may at least partially decide (e.g., impact, influence, or inform) a per-antenna power budget. For example, some systems may support multiple waveforms and dynamic waveform switches, such as for long slot or slot-less operation, which may introduce or involve dynamic waveform switching. Such multiple waveforms may include an OFDM waveform, a DFT-S-OFDM waveform (e.g., a type of digital waveform that may be used for transmitting data over a relatively wide RF channel, such as for spreading data symbols over an entire signal bandwidth), an enhanced DFT-S-OFDM waveform, an orthogonal time-frequency space (OTFS) waveform, an orthogonal chirp division multiplexing (OCDM) waveform, an orthogonal time sequence multiplexing (OTSM) waveform, a CW waveform (e.g., an electromagnetic wave of constant amplitude and frequency), an SRS waveform, or a frequency modulated continuous wave (FMCW), among other examples.

Such systems may introduce or associate one or more waveforms for vertical use cases, such as for RF sensing or UE positioning. For example, some systems may use an FMCW waveform to support uplink-based bistatic sensing or uplink-based UE positioning. In some aspects, precoder settings/parameters and transmission power budget per-antenna may be different across different waveform types. Further, different uplink channels (e.g., a physical uplink control channel (PUCCH) and a physical uplink shared channel (PUSCH)) may apply different MIMO transmission schemes. For example, a UE 115 and a network entity 105 may support closed-loop MIMO for PUSCH transmissions and may support open-loop MIMO for PUCCH transmissions. By way of further example, a different set of antennas may be selected (or relatively more suitable) depending on via which channel type a UE 115 transmits, which reference signal type a UE 115 transmits, or a device/operational usage of a UE 115.

Some example implementations support closed-loop antenna selection mechanisms, and associated or supporting control signaling schemes, according to which a network entity 105 may determine antenna selection for different types of waveforms, channels, reference signals, or usages at a UE 115, which may facilitate efficient antenna selection operation across various deployment scenarios, operating conditions, or operational modes. In accordance with such example implementations, the UE 115 may perform the antenna selection 200 based on antenna selection results received from a network entity 105, which the network entity 105 may determine based on information provided to the network entity 105 from the UE 115.

Figure 3:
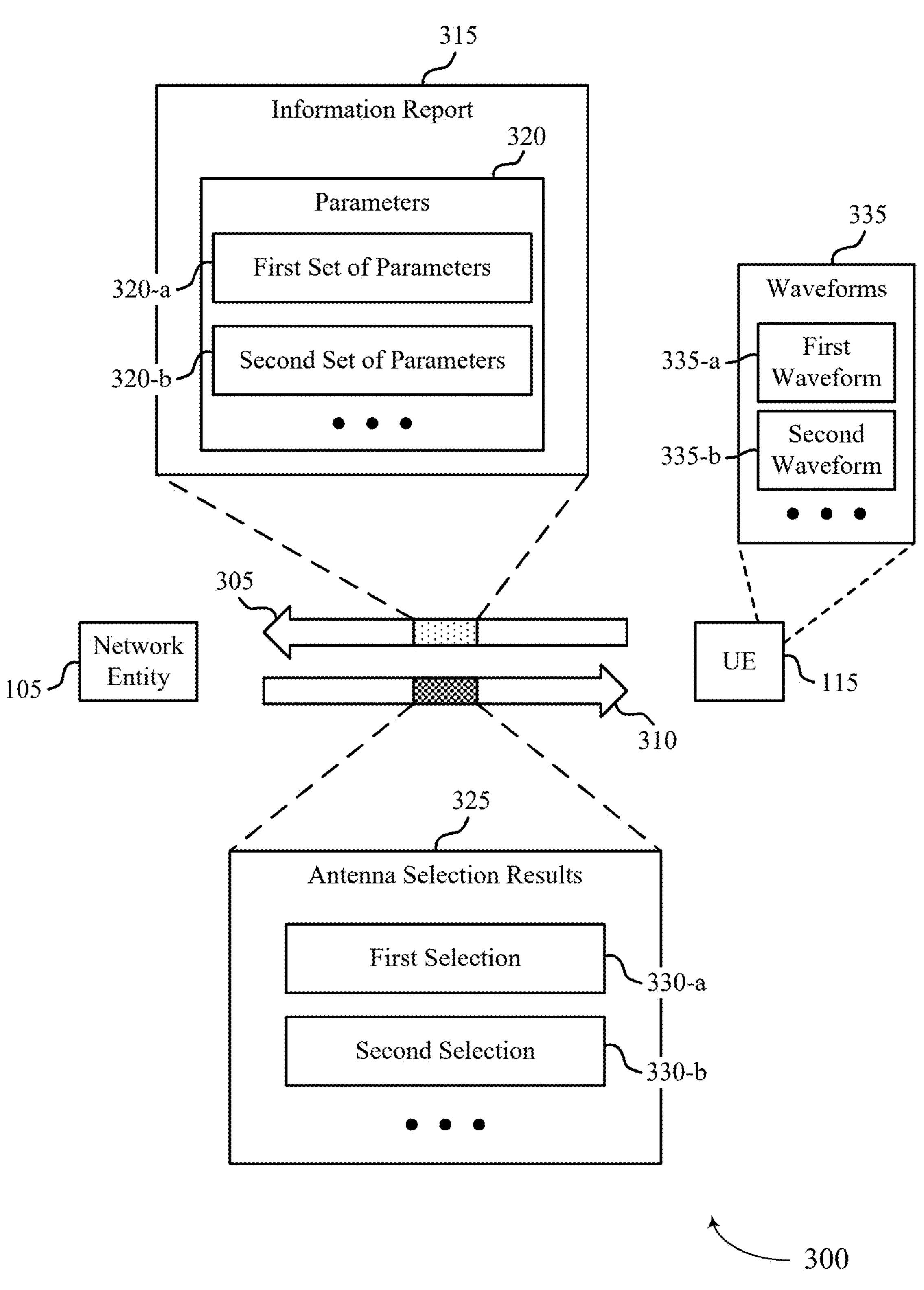
FIG. 3 shows an example of a signaling diagram that supports waveform specific closed-loop antenna selection in accordance with one or more aspects of the present disclosure.

FIG. 3 shows an example of a signaling diagram 300 that supports waveform specific closed-loop antenna selection in accordance with one or more aspects of the present disclosure. The signaling diagram 300 may implement or be implemented to realize one or more aspects of the wireless communications system 100 or the antenna selection 200. For example, the signaling diagram 300 illustrates communication (via an uplink 305 and a downlink 310) between a UE 115 and a network entity 105, which may be examples of corresponding devices illustrated and described herein, including by and with reference to FIGS. 1 and 2. The UE 115 may support or operate a set of antennas 210, as illustrated by and described with reference to FIG. 2, and may leverage the signaling diagram 300 to perform the antenna selection 200 in accordance with a waveform specific closed-loop antenna selection scheme between the UE 115 and the network entity 105.

As part of the waveform specific closed-loop antenna selection scheme, the UE 115 may transmit an information report 315 associated with the set of antennas 210 of the UE 115. For example, the information report 315 may include parameters 320, which may include a first set of parameters 320-*a* and a second set of parameters 320-*b*. The parameters 320 may include a respective set of parameters associated with each waveform of multiple waveforms 335 supported, used, or usable by the UE 115. The multiple waveforms 335 may include a first waveform 335-*a* and a second waveform 335-*b*, potentially among other waveforms. In some examples, the first set of parameters 320-*a* may be associated with the set of antennas 210 for (corresponding to, based on, pertaining to, associated with, or applicable to) the first waveform 335-*a*. By way of further example, the second set of parameters 320-*b* may be associated with the set of antennas 210 for (corresponding to, based on, pertaining to, associated with, or applicable to) the second waveform 335-*b*. The first set of parameters 320-*a* may include, indicate, or convey a first set of values, each value of the first set of values corresponding to a respective antenna of the set of antennas 210 and being associated with the first waveform 335-*a*. The second set of parameters 320-*b* may include, indicate, or convey a second set of values, each value of the second set of values corresponding to a respective antenna of the set of antennas 210 and being associated with the second waveform 335-*b*.

In some examples, the first set of values may be a first set of PHR values, and the second set of values may be a second set of PHR values. In such examples, the first set of parameters 320-*a* may include, indicate, or convey at least a first PHR value corresponding to a first antenna (e.g., the antenna 210-*a*) of the set of antennas 210 and associated with the first waveform 335-*a*. By way of further example, the second set of parameters 320-*b* may include, indicate, or convey at least a second PHR value corresponding to the first antenna (e.g., the antenna 210-*a*) of the set of antennas 210 and associated with the second waveform 335-*b*. Thus, the information report 315 may provide information to the network entity 105 regarding at least some antennas of the UE 115 on a per-waveform basis, such that the network entity 105 may obtain information indicative of, for example, multiple (e.g., different) PHR values at each antenna. A quantity of, for example, PHR values provided by the information report 315 for each antenna of the set of antennas 210 may be associated with (e.g., may be equal to) a quantity of the multiple waveforms 335 supported, used, or usable by the UE 115. Additional details related to the information report 315 are illustrated and described herein, including by and with reference to FIGS. 4-7.

The network entity 105 may determine and transmit, to the UE 115, antenna selection results 325 in accordance with (e.g., based on) the information report 315. The network entity 105 may determine the antenna selection results 325 under (e.g., in accordance with) an uplink precoding assumption, which the network entity 105 may determine autonomously or based on information received from the UE 115. The network entity 105 may transmit the antenna selection results 325 to the UE 115 via one or more downlink control information (DCI) formats (e.g., one or more DCI messages), via one or more MAC control elements (MAC-CEs), or via RRC signaling (e.g., one or more RRC messages or one or more RRC information elements).

The antenna selection results 325 may include an indication of a first selection 330-*a* and a second selection 330-*b*.

In some examples, the antenna selection results 325 may indicate a respective selection (e.g., an antenna selection) for each waveform of the multiple waveforms 335 supported, used, or usable by the UE 115. Additionally, or alternatively, the antenna selection results 325 may indicate a respective selection (e.g., an antenna selection) for each waveform of the multiple waveforms 335 for which the UE 115 provides information via the information report 315. For example, the first selection 330-*a* may be of one or more first antennas of the set of antennas 210 for the first waveform 335-*a*. By way of further example, the second selection 330-*b* may be of one or more second antennas of the set of antennas 210 for the second waveform 335-*b*.

The UE 115 may perform wireless communication (e.g., one or both of transmission and reception) in accordance with or otherwise based on the antenna selection results 325 (e.g., the first selection 330-*a* and the second selection 330-*b*). For example, the UE 115 may communicate in accordance with (e.g., using) the first waveform 335-*a* via at least a first antenna of the one or more first antennas based on the indication of the first selection 330-*a*. Additionally, or alternatively, the UE 115 may communicate in accordance with (e.g., using) the second waveform 335-*b* via at least a second antenna of the one or more second antennas based on the indication of the second selection 330-*b*. In examples in which the UE 115 dynamically switches between waveforms of the multiple waveforms 335 over time, the UE 115 may communicate in accordance with the first waveform 335-*a* via at least the first antenna of the one or more first antennas within a first time period (e.g., a first set of symbols, slots, milliseconds, or other time domain unit) and may communicate in accordance with the second waveform 335-*b* via at least the second antenna of the one or more second antennas within a second time period (e.g., a second set of symbols, slots, milliseconds, or other time domain unit).

In some implementations, the UE 115 may communicate via the one or more first antennas, as indicated by the first selection 330-*a*, or via the one or more second antennas, as indicated by the second selection 330-*b*, without further selection, refinement, decision, or input from the UE 115. In such implementations, the UE 115 may use the antenna selection results 325 as provided by the network entity 105 as a final antenna selection. In some other implementations, the UE 115 may select and communicate via a subset of the one or more first antennas or via a subset of the one or more second antennas in accordance with further selection, refinement, decision, or input from the UE 115. In such implementations, the UE 115 may use the antenna selection results 325 as provided by the network entity 105 as a preliminary, intermediate, or candidate antenna selection and the UE 115 may perform a final antenna selection from the options or candidates indicated by the antenna selection results 325.

Figure 4:
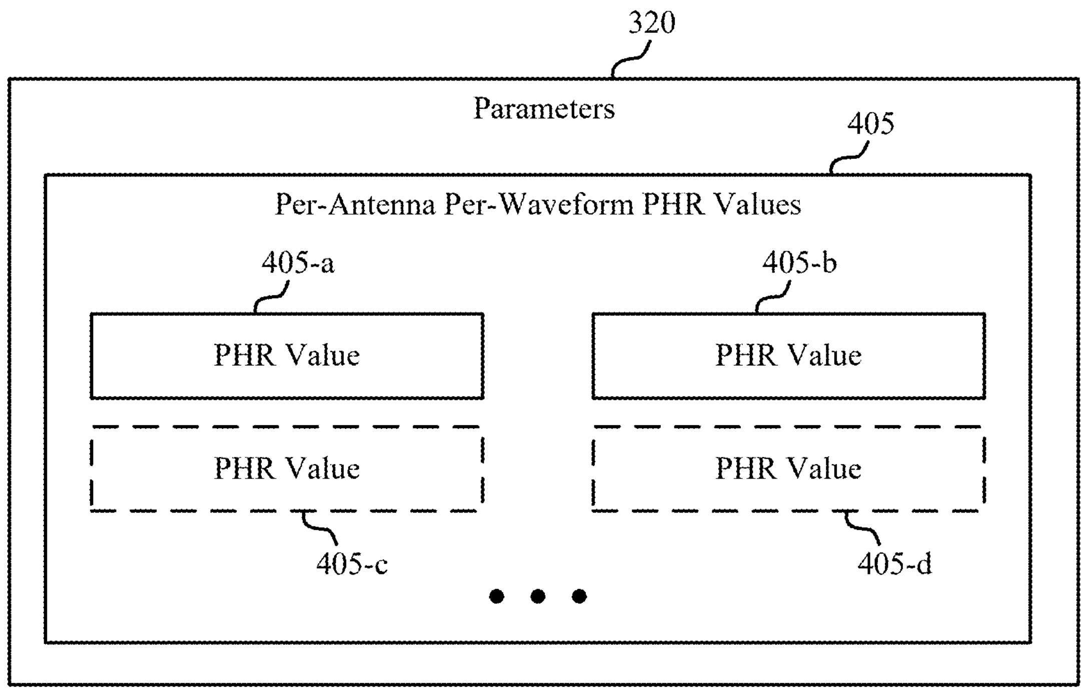
FIGS. 4-7 show examples of information reports that support waveform specific closed-loop antenna selection in accordance with one or more aspects of the present disclosure.

FIG. 4 shows an example of an information report 400 that supports waveform specific closed-loop antenna selection in accordance with one or more aspects of the present disclosure. For example, the information report 400 may be an example of the information report 315 as illustrated by and described with reference to FIG. 3. In such examples, the information report 400 may include the parameters 320. In some implementations, the parameters 320 may include a set of per-antenna per-waveform PHR values 405. In other words, within the information report 400, the UE 115 may signal (e.g., transmit, indicate, provide, or convey) a set of per-antenna per-waveform PHR values 405.

In some examples, the set of per-antenna per-waveform PHR values 405 may include a first PHR value 405-*a* and a second PHR value 405-*b*. The first PHR value 405-*a* may correspond to a first antenna (e.g., the antenna 210-*a*) of the set of antennas 210 and may be associated with the first waveform 335-*a*. The second PHR value 405-*b* may correspond to the first antenna (e.g., the antenna 210-*a*) of the set of antennas 210 and may be associated with the second waveform 335-*b*. Additionally, in some examples, the set of per-antenna per-waveform PHR values 405 may include a PHR value 405-*c* and a PHR value 405-*d*. The PHR value 405-*c* may correspond to a second antenna (e.g., the antenna 210-*b*) of the set of antennas 210 and may be associated with the first waveform 335-*a*. The PHR value 405-*d* may correspond to the second antenna (e.g., the antenna 210-*b*) of the set of antennas 210 and may be associated with the second waveform 335-*b*. Accordingly, one or both of the first PHR value 405-*a* and the PHR value 405-*c* may be values indicted by the first set of parameters 320-*a* (e.g., values associated with the first waveform 335-*a*) and one or both of the second PHR value 405-*b* and the PHR value 405-*d* may be values indicated by the second set of parameters 320-*b* (e.g., values associated with the second waveform 335-*b*).

Figure 5:
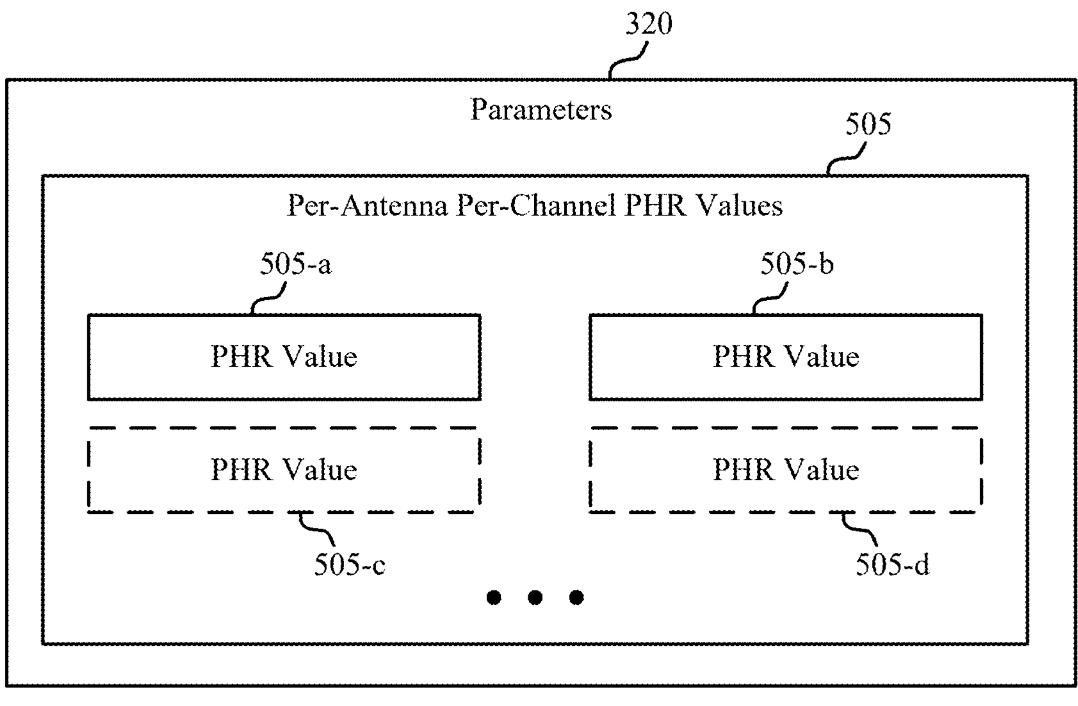

FIG. 5 shows an example of an information report 500 that supports waveform specific closed-loop antenna selection in accordance with one or more aspects of the present disclosure. For example, the information report 500 may be an example of the information report 315 as illustrated by and described with reference to FIG. 3. In such examples, the information report 500 may include the parameters 320. In some implementations, the parameters 320 may include a set of per-antenna per-channel PHR values 505. In other words, within the information report 500, the UE 115 may signal (e.g., transmit, indicate, provide, or convey) a set of per-antenna per-channel PHR values 505. Some example channels may include a PUSCH, a PUCCH, a physical downlink shared channel (PDSCH), and a physical downlink control channel (PDCCH), among other examples. For each of one or more of such channels, the UE 115 may have different per-antenna PHR values.

In some examples, the set of per-antenna per-channel PHR values 505 may include a first PHR value 505-*a* and a second PHR value 505-*b*. The first PHR value 505-*a* may correspond to a first antenna (e.g., the antenna 210-*a*) of the set of antennas 210 and may be associated with a first channel (e.g., a PUSCH or any first channel type). The second PHR value 505-*b* may correspond to the first antenna (e.g., the antenna 210-*a*) of the set of antennas 210 and may be associated with a second channel (e.g., a PUCCH or any second channel type). Additionally, in some examples, the set of per-antenna per-channel PHR values 505 may include a PHR value 505-*c* and a PHR value 505-*d*. The PHR value 505-*c* may correspond to a second antenna (e.g., the antenna 210-*b*) of the set of antennas 210 and may be associated with the first channel (e.g., the PUSCH or the first channel type). The PHR value 505-*d* may correspond to the second antenna (e.g., the antenna 210-*b*) of the set of antennas 210 and may be associated with the second channel (e.g., the PUCCH or the second channel type).

In some implementations, each channel (e.g., each channel type) of a set of channels (e.g., a set of channel types) via which the UE 115 is capable of communicating may be associated with a respective waveform of the multiple waveforms 335. For example, the first channel (e.g., the PUSCH or the first channel type) may be associated with the first waveform 335-*a* and the second channel (e.g., the PUCCH or the second channel type) may be associated with the second waveform 335-*b*. In such examples, one or both of the first PHR value 505-*a* and the PHR value 505-*c* may be values indicted by the first set of parameters 320-*a* (e.g., values associated with the first waveform 335-*a* by way of being associated with the first channel) and one or both of the second PHR value 505-*b* and the PHR value 505-*d* may be values indicated by the second set of parameters 320-*b* (e.g., values associated with the second waveform 335-*b* by way of being associated with the second channel).

Additionally, or alternatively, each channel of the set of channels via which the UE 115 is capable of communicating may be associated with a respective antenna selection scheme (e.g., a respective closed-loop antenna selection scheme). For example, the first channel may be associated with a first antenna selection scheme and the second channel may be associated with a second antenna selection scheme. In such examples, the antenna selection results 325 may indicate per-channel antenna selection results to the UE 115.

Figure 6:
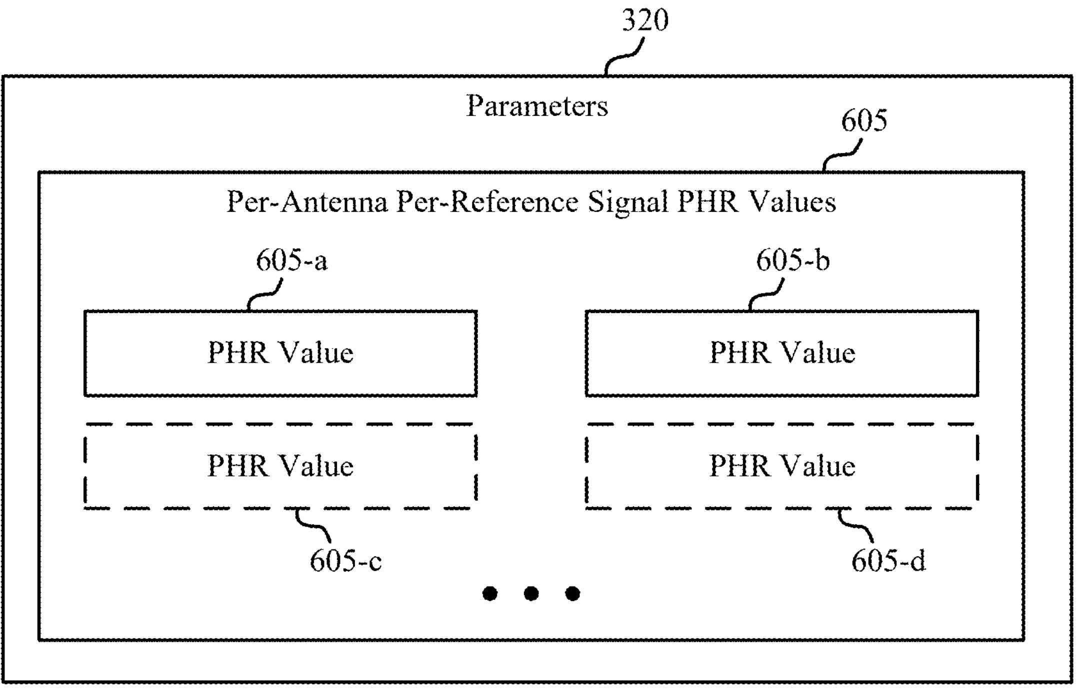

FIG. 6 shows an example of an information report 600 that supports waveform specific closed-loop antenna selection in accordance with one or more aspects of the present disclosure. For example, the information report 600 may be an example of the information report 315 as illustrated by and described with reference to FIG. 3. In such examples, the information report 600 may include the parameters 320. In some implementations, the parameters 320 may include a set of per-antenna per-reference signal PHR values 605. In other words, within the information report 600, the UE 115 may signal (e.g., transmit, indicate, provide, or convey) a set of per-antenna per-reference signal PHR values 605. Some example reference signals may include an SRS, a channel state information (CSI) reference signal (CSI-RS), a synchronization signal block (SSB), and a positioning reference signal (PRS), among other examples. For each of one or more of such reference signals, the UE 115 may have different per-antenna PHR values.

In some examples, the set of per-antenna per-reference signal PHR values 605 may include a first PHR value 605-*a* and a second PHR value 605-*b*. The first PHR value 605-*a* may correspond to a first antenna (e.g., the antenna 210-*a*) of the set of antennas 210 and may be associated with a first reference signal (e.g., any first reference signal type). The second PHR value 605-*b* may correspond to the first antenna (e.g., the antenna 210-*a*) of the set of antennas 210 and may be associated with a second reference signal (e.g., any second reference signal type). Additionally, in some examples, the set of per-antenna per-reference signal PHR values 605 may include a PHR value 605-*c* and a PHR value 605-*d*. The PHR value 605-*c* may correspond to a second antenna (e.g., the antenna 210-*b*) of the set of antennas 210 and may be associated with the first reference signal (e.g., the first reference signal type). The PHR value 605-*d* may correspond to the second antenna (e.g., the antenna 210-*b*) of the set of antennas 210 and may be associated with the second reference signal (e.g., the second reference signal type).

In some implementations, each reference signal (e.g., each reference signal type) of a set of reference signals (e.g., a set of reference signal types) that the UE 115 is capable of communicating may be associated with a respective waveform of the multiple waveforms 335. For example, the first reference signal (e.g., the first reference signal type) may be associated with the first waveform 335-*a* and the second reference signal (e.g., the second reference signal type) may be associated with the second waveform 335-*b*. In such examples, one or both of the first PHR value 605-*a* and the PHR value 605-*c* may be values indicted by the first set of parameters 320-*a* (e.g., values associated with the first waveform 335-*a* by way of being associated with the first reference signal) and one or both of the second PHR value 605-*b* and the PHR value 605-*d* may be values indicated by the second set of parameters 320-*b* (e.g., values associated with the second waveform 335-*b* by way of being associated with the second reference signal).

Additionally, or alternatively, each reference signal of the set of reference signals that the UE 115 is capable of communicating may be associated with a respective antenna selection scheme (e.g., a respective closed-loop antenna selection scheme). For example, the first reference signal may be associated with a first antenna selection scheme and the second reference signal may be associated with a second antenna selection scheme. In such examples, the antenna selection results 325 may indicate per-reference signal antenna selection results to the UE 115.

Figure 7:
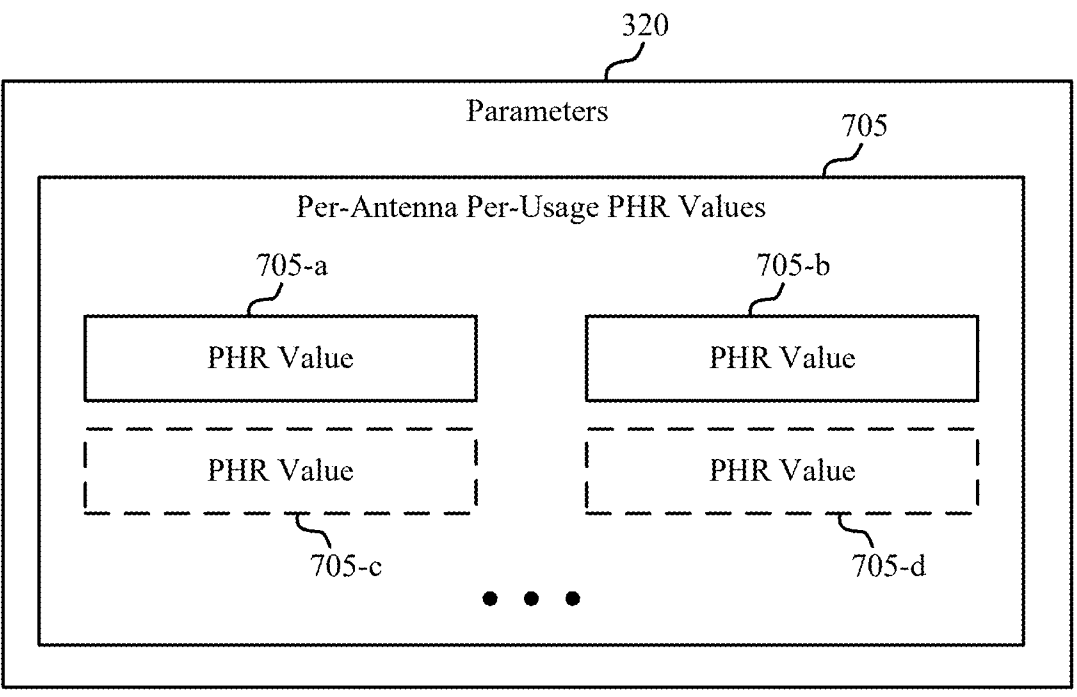

FIG. 7 shows an example of an information report 700 that supports waveform specific closed-loop antenna selection in accordance with one or more aspects of the present disclosure. For example, the information report 700 may be an example of the information report 315 as illustrated by and described with reference to FIG. 3. In such examples, the information report 700 may include the parameters 320. In some implementations, the parameters 320 may include a set of per-antenna per-usage PHR values 705. In other words, within the information report 700, the UE 115 may signal (e.g., transmit, indicate, provide, or convey) a set of per-antenna per-usage PHR values 705. Some example usages may include, for an SRS waveform or an FMCW waveform, "communication," "positioning," and "RF sensing." In this context, a usage of "communication" may more specifically refer to data communication with another wireless device. For each of one or more of such usages, the UE 115 may have different per-antenna PHR values.

In some examples, the set of per-antenna per-usage PHR values 705 may include a first PHR value 705-*a* and a second PHR value 705-*b*. The first PHR value 705-*a* may correspond to a first antenna (e.g., the antenna 210-*a*) of the set of antennas 210 and may be associated with a first usage (e.g., any first usage type). The second PHR value 705-*b* may correspond to the first antenna (e.g., the antenna 210-*a*) of the set of antennas 210 and may be associated with a second usage (e.g., any second usage type). Additionally, in some examples, the set of per-antenna per-usage PHR values 705 may include a PHR value 705-*c* and a PHR value 705-*d*. The PHR value 705-*c* may correspond to a second antenna (e.g., the antenna 210-*b*) of the set of antennas 210 and may be associated with the first usage (e.g., the first usage type). The PHR value 705-*d* may correspond to the second antenna (e.g., the antenna 210-*b*) of the set of antennas 210 and may be associated with the second usage (e.g., the second usage type).

In some implementations, each usage (e.g., each usage type) of a set of usages (e.g., a set of usage types) in accordance with which the UE 115 is capable of communicating may be associated with a respective waveform of the multiple waveforms 335. For example, the first usage may be associated with the first waveform 335-*a* and the second usage may be associated with the second waveform 335-*b*. In such examples, one or both of the first PHR value 705-*a* and the PHR value 705-*c* may be values indicted by the first set of parameters 320-*a* (e.g., values associated with the first waveform 335-*a* by way of being associated with the first usage) and one or both of the second PHR value 705-*b* and the PHR value 705-*d* may be values indicated by the second set of parameters 320-*b* (e.g., values associated with the second waveform 335-*b* by way of being associated with the second usage).

Additionally, or alternatively, each usage of the set of usages in accordance with which the UE 115 is capable of communicating may be associated with a respective antenna selection scheme (e.g., a respective closed-loop antenna selection scheme). For example, the first usage may be associated with a first antenna selection scheme and the second usage may be associated with a second antenna selection scheme. In such examples, the antenna selection results 325 may indicate per-usage antenna selection results to the UE 115.

Figure 8:
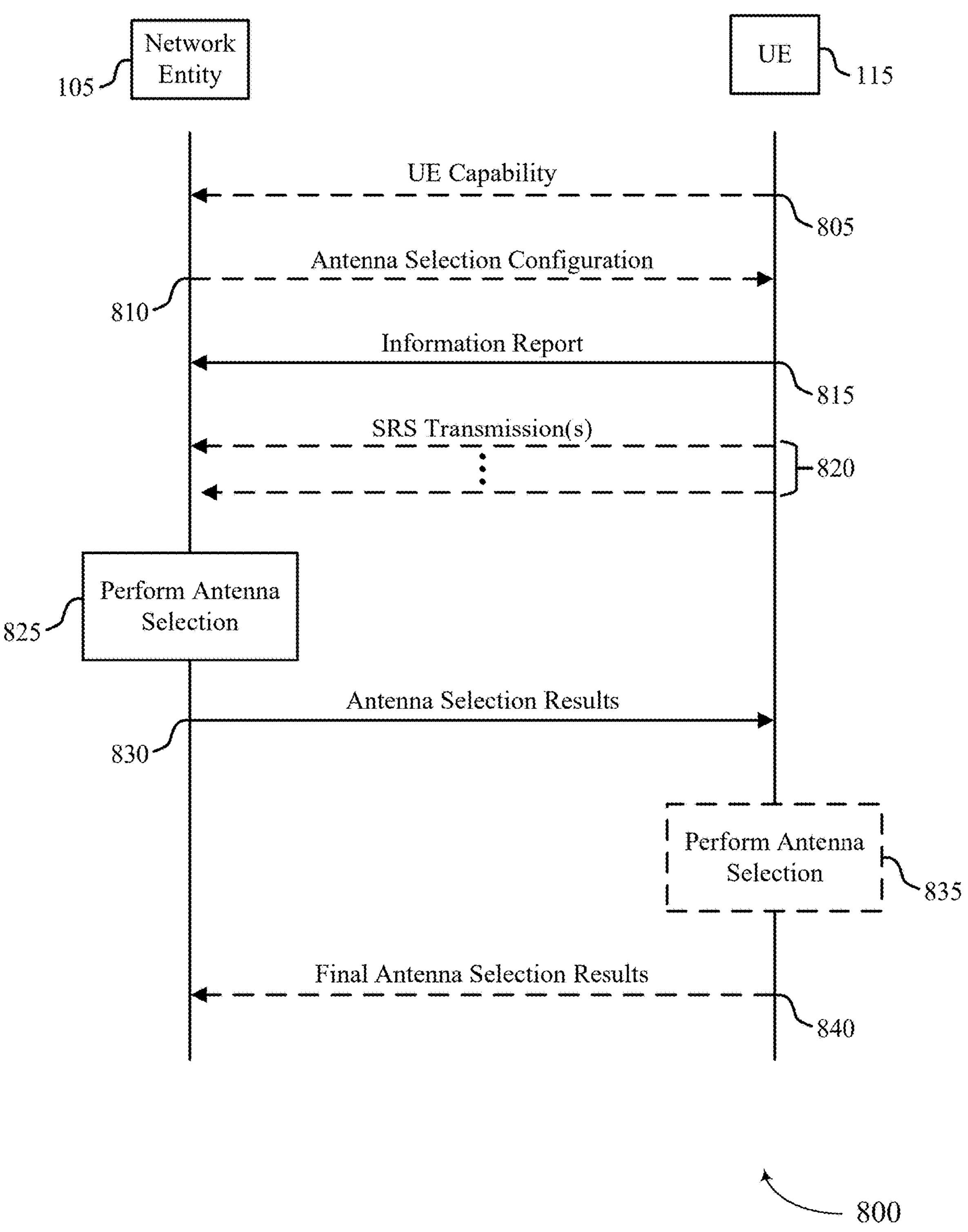
FIG. 8 shows an example of a process flow that supports waveform specific closed-loop antenna selection in accordance with one or more aspects of the present disclosure.

FIG. 8 shows an example of a process flow 800 that supports waveform specific closed-loop antenna selection in accordance with one or more aspects of the present disclosure. The process flow 800 may implement or be implemented to realize one or more aspects of the wireless communications system 100, the antenna selection 200, the signaling diagram 300, the information report 400, the information report 500, the information report 600, and the information report 700. For example, the process flow 800 illustrates communication between a UE 115 and a network entity 105, which may be examples of corresponding devices as illustrated and described herein.

In the following description of the process flow 800, the operations may be performed (such as reported or provided) in a different order than the order shown, or the operations performed by the example devices may be performed in different orders or at different times. Some operations also may be left out of the process flow 800, or other operations may be added to the process flow 800. Further, although some operations or signaling may be shown to occur at different times for discussion purposes, these operations may actually occur at the same time.

At 805, the UE 115 may transmit, to the network entity 105, information indicative of a capability of the UE 115. Such information may include antenna selection-related capability reporting, which may include or indicate one or both of a quantity of communication chains at the UE 115 and a quantity of antennas at the UE 115 (e.g., via an indication of pCqA). Additionally, or alternatively, the UE 115 may indicate whether the UE 115 is capable of one or more of waveform specific closed-loop antenna selection, channel specific closed-loop antenna selection, reference signal specific closed-loop antenna selection, and usage specific closed-loop antenna selection. The UE 115 may transmit the information indicative of the capability of the UE 115 via UE assistance signaling, such as via one or more uplink control information (UCI) formats or messages, one or more MAC-CEs, or RRC signaling (e.g., one or more RRC messages or one or more RRC information elements).

At 810, the UE 115 may receive, from the network entity 105, information indicative of an antenna selection configuration. In some aspects, the antenna selection configuration may indicate or include an SRS resource configuration. In some implementations, the SRS resource configuration may be a per-waveform, per-channel, per-reference signal, or per-usage SRS resource configuration. For example, one or more RF-related parameters may be different for different waveforms and, in such examples, the network entity 105 may configure or indicate different SRS resources based on different waveforms to aid with measurements by the network entity 105 for closed-loop antenna selection. Accordingly, in some implementations, an SRS resource configuration may indicate one or more waveform types. For example, for a non-OFDM type of waveform, such as an FMCW waveform, an "SRS" (or any other reference signal functioning or interpreted as an SRS) may be configured as an FMCW waveform with similar parameters, such as a same slope and bandwidth. In such implementations, the UE 115 may receive control signaling (e.g., RRC signaling) indicative of multiple SRS resource configurations, with the multiple SRS resource configurations including a first SRS resource configuration associated with a first waveform (e.g., the first waveform 335-*a*) and a second SRS resource configuration associated with a second waveform (e.g., the second waveform 335-*b*). Accordingly, the antenna selection configuration may be understood as or otherwise facilitate waveform specific "SRS" (or another signal of another waveform type associated with facilitating measurement of an uplink channel at the network entity 105) for closed-loop antenna selection.

At 815, the UE 115 may transmit, to the network entity 105, an information report (e.g., the information report 315, the information report 400, the information report 500, the information report 600, and the information report 700). The information report may include multiple parameters (e.g., the parameters 320) associated with the set of antennas of the UE 115. The multiple parameters may include a first set of parameters (e.g., the first set of parameters 320-*a*) associated with the set of antennas for a first waveform (e.g., the first waveform 335-*a*) and a second set of parameters (e.g., the second set of parameters 320-*b*) associated with the set of antennas for a second waveform (e.g., the second waveform 335-*b*). The multiple parameters may include or indicate one or more of per-antenna per-waveform PHR values (e.g., the set of per-antenna per-waveform PHR values 405), per-antenna per-channel PHR values (e.g., the set of per-antenna per-channel PHR values 505), per-antenna per-reference signal PHR values (e.g., the set of per-antenna per-reference signal PHR values 605), and per-antenna per-usage PHR values (e.g., the set of per-antenna per-usage PHR values 705).

At 820, the UE 115 may transmit, to the network entity 105, one or more SRSs. In other words, the UE 115 may perform one or more SRS transmissions. The UE 115 may transmit a respective set of one or more SRSs via each antenna of at least a subset of the set of antennas of the UE 115. In some implementations, the UE 115 may transmit the SRSs in accordance with the one or more SRS resource configurations received from the network entity 105. In implementations in which the one or more SRS resource configurations include per-waveform SRS resource configurations, the UE 115 may transmit, via each antenna of at least a subset of the set of antennas of the UE 115, a first respective set of SRSs in accordance with the first sounding reference signal resource configuration associated with the first waveform 335-*a* and a second respective set of SRSs in accordance with the second sounding reference signal resource configuration associated with the second waveform 335-*b*.

At 825, the network entity 105 may perform an antenna selection based on the information report and the SRS transmission(s). For example, the network entity 105 may select one or more antennas for the UE 115 to use for (subsequent) communication. In accordance with one or both of the information report and the SRS transmission(s), the network entity 105 may perform the antenna selection on a per-waveform, per-channel, per-reference signal, or per-usage basis.

At 830, the UE 115 may receive, from the network entity 105, antenna selection results (e.g., the antenna selection results 325). The antenna selection results may include an indication of a first selection (e.g., the first selection 330-*a*) of one or more first antennas for the first waveform (e.g., the first waveform 335-*a*) and a second selection (e.g., the second selection 330-*b*) of one or more second antennas for the second waveform (e.g., the second waveform 335-*b*). The one or more first antennas may be the same as, partially different than, or completely different than the one or more second antennas. The network entity 105 may indicate the antenna selection results as per-waveform antenna selection results, per-channel antenna selection results, per-reference signal antenna selection results, per-usage antenna selection results, or any combination thereof. For example, the network entity 105 may indicate the one or more first antennas for the first waveform, a first channel, a first reference signal, or a first usage and may indicate the one or more second antennas for the second waveform, a second channel, a second reference signal, or a second usage.

In some implementations, per rank or per codebook based antenna selection results may be augmented with the waveform, channel, reference signal, or usage type information. For example, the first selection of the one or more first antennas for the first waveform, channel, reference signal, or usage and the second selection of the one or more second antennas for the second waveform, channel, reference signal, or usage may be in accordance with (e.g., in addition to) one or both of a per-rank antenna selection and a per-codebook antenna selection. In such examples, for a first rank or codebook, the antenna selection results may indicate a first set of antenna selections (on a per-waveform, per-channel, per-reference signal, or per-usage basis) and, for a second rank or codebook, the antenna selection results may indicate a second set of antenna selections (on a per-waveform, per-channel, per-reference signal, or per-usage basis).

In some implementations, the UE 115 may use the antenna selection results as provided by the network entity 105 as final antenna selection results. In such implementations, the UE 115 may perform communication using the one or more first antennas when communicating in accordance with or using the first waveform, channel, reference signal, or usage and may perform communication using the one or more second antennas when communicating in accordance with or using the second waveform, channel, reference signal, or usage. Alternatively, in some other implementations, the UE 115 may use the antenna selection results as provided by the network entity 105 as preliminary, intermediate, or candidate antenna selection results.

At 835, in such implementations in which the UE 115 uses the antenna selection results provided by the network entity 105 as preliminary, intermediate, or candidate antenna selection results, the UE 115 may perform an antenna selection. For example, the UE 115 may select a subset of antennas of the antennas indicated by the network entity 105 (e.g., in accordance with one or more factors or considerations at the UE 115). For example, the UE 115 may select at least a first antenna from the one or more first antennas for communication in accordance with or using the first waveform, channel, reference signal, or usage. By way of further example, the UE 115 may select at least a second antenna from the one or more second antennas for communication in accordance with or using the second waveform, channel, reference signal, or usage.

At 840, in implementations in which the UE 115 uses the antenna selection results provided by the network entity 105 as preliminary, intermediate, or candidate antenna selection results and performs the antenna selection at 835, the UE 115 may transmit information indicative of final antenna selection results to the network entity 105. For example, the UE 115 may inform the network entity 105 of selected antenna(s) of the one or more first antennas that the UE 115 may use for communication in accordance with or using the first waveform, channel, reference signal, or usage. By way of further example, the UE 115 may inform the network entity 105 of selected antenna(s) of the one or more second antennas that the UE 115 may use for communication in accordance with or using the second waveform, channel, reference signal, or usage.

In accordance with such a waveform, channel, reference signal, or usage specific closed-loop antenna selection scheme, the UE 115 may perform communication in accordance the selected antenna(s) on a per-waveform, per-channel, per-reference signal, or per-usage basis. For example, the UE 115 may use at least the first antenna of the one or more first antennas within a first time period in which the UE 115 communicates in accordance with or using the first waveform, channel, reference signal, or usage. By way of further example, the UE 115 may use at least the second antenna of the one or more second antennas within a second time period in which the UE 115 communicates in accordance with or using the second waveform, channel, reference signal, or usage. Such communication may include data communication (e.g., data transmission or reception, such as to or from the network entity 105 or another wireless device), CW transmissions, RF sensing, or UE positioning, among other examples.

Figure 9:
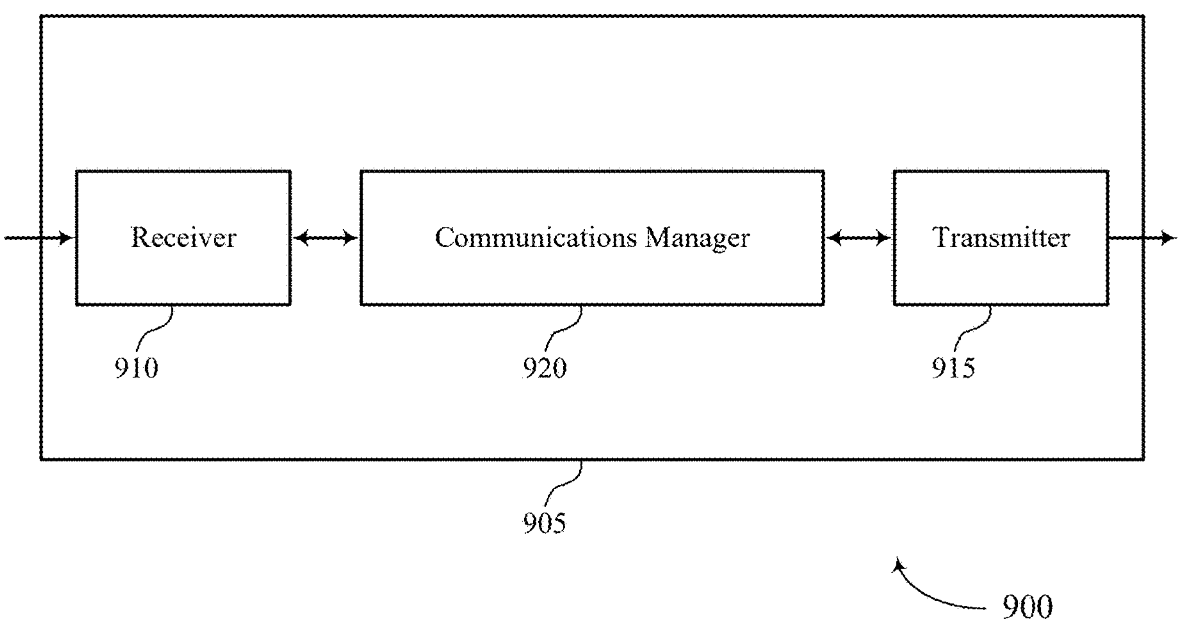
FIGS. 9 and 10 show diagrams of devices that support waveform specific closed-loop antenna selection in accordance with one or more aspects of the present disclosure.

FIG. 9 shows a diagram 900 of a device 905 that supports waveform specific closed-loop antenna selection in accordance with one or more aspects of the present disclosure. The device 905 may be an example of aspects of a UE 115 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to waveform specific closed-loop antenna selection). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to waveform specific closed-loop antenna selection). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations or components thereof may be examples of means for performing various aspects of waveform specific closed-loop antenna selection as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a digital signal processor (DSP), a central processing unit (CPU), a neural processing unit (NPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, an NPU, a GPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for transmitting, to a network entity, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform. The communications manager 920 is capable of, configured to, or operable to support a means for receiving, from the network entity, an indication of a first selection of one or more first antennas of the set of multiple antennas for the first waveform and a second selection of one or more second antennas of the set of multiple antennas for the second waveform based on the information report. The communications manager 920 is capable of, configured to, or operable to support a means for communicating in accordance with the first waveform via at least a first antenna of the one or more first antennas and in accordance with the second waveform via at least a second antenna of the one or more second antennas based on the indication of the first selection and the second selection.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced power consumption, more efficient utilization of communication and hardware resources, and greater reliability by supporting per-waveform antenna selection.

Figure 10:
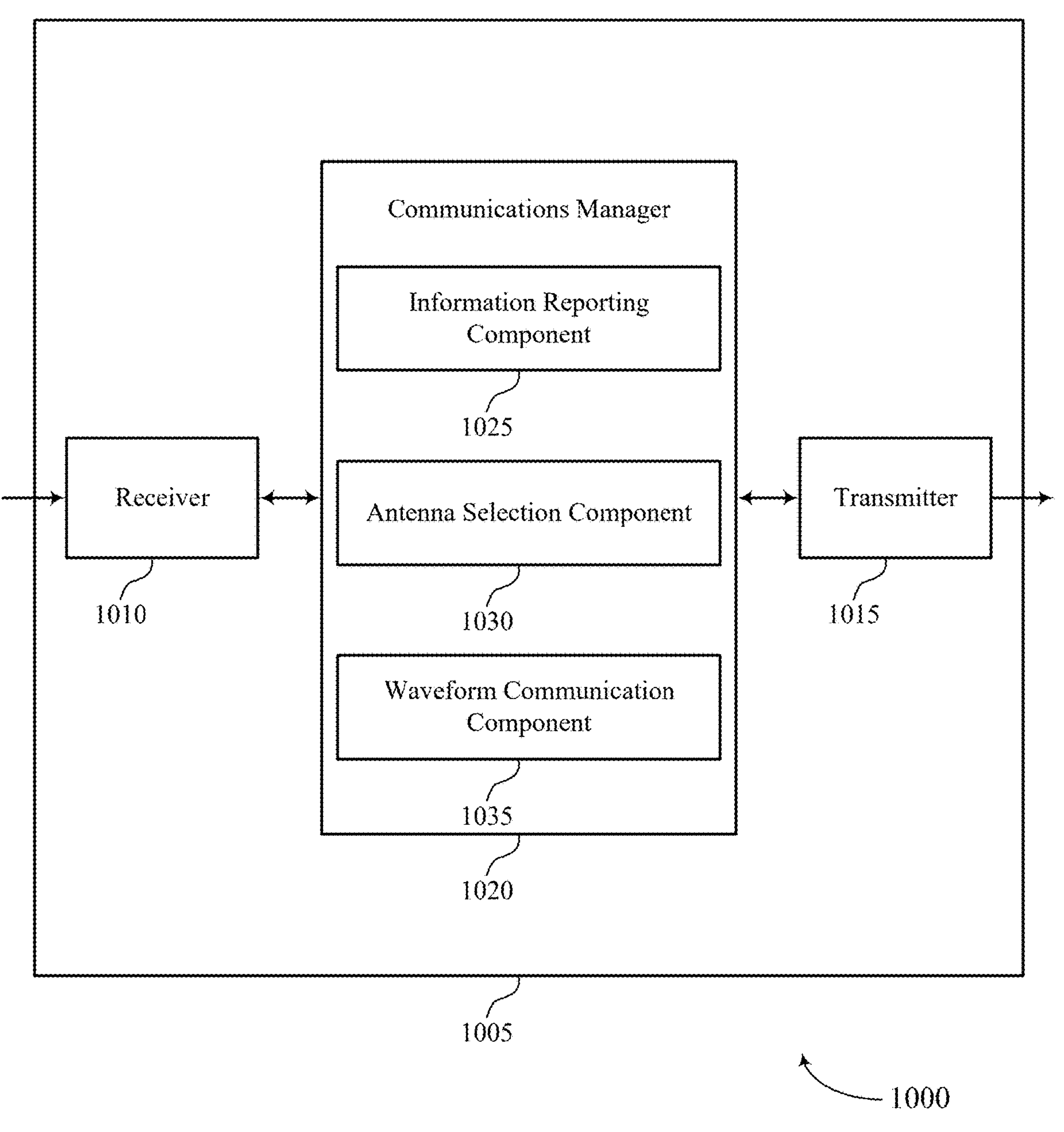

FIG. 10 shows a diagram 1000 of a device 1005 that supports waveform specific closed-loop antenna selection in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to waveform specific closed-loop antenna selection). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to waveform specific closed-loop antenna selection). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of waveform specific closed-loop antenna selection as described herein. For example, the communications manager 1020 may include an information reporting component 1025, an antenna selection component 1030, a waveform communication component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The information reporting component 1025 is capable of, configured to, or operable to support a means for transmitting, to a network entity, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform. The antenna selection component 1030 is capable of, configured to, or operable to support a means for receiving, from the network entity, an indication of a first selection of one or more first antennas of the set of multiple antennas for the first waveform and a second selection of one or more second antennas of the set of multiple antennas for the second waveform based on the information report. The waveform communication component 1035 is capable of, configured to, or operable to support a means for communicating in accordance with the first waveform via at least a first antenna of the one or more first antennas and in accordance with the second waveform via at least a second antenna of the one or more second antennas based on the indication of the first selection and the second selection.

Figure 11:
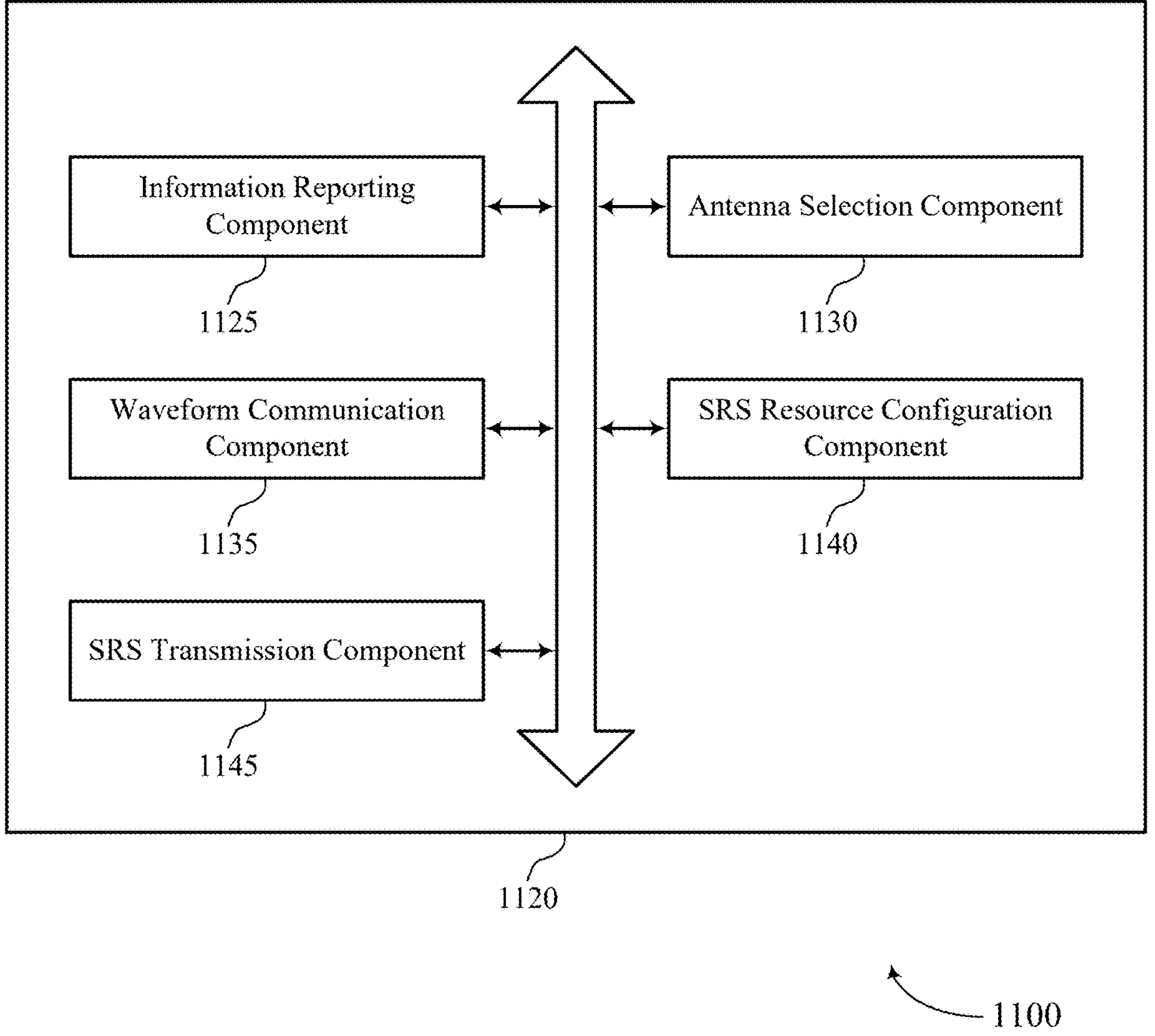
FIG. 11 shows a diagram of a communications manager that supports waveform specific closed-loop antenna selection in accordance with one or more aspects of the present disclosure.

FIG. 11 shows a diagram 1100 of a communications manager 1120 that supports waveform specific closed-loop antenna selection in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of waveform specific closed-loop antenna selection as described herein. For example, the communications manager 1120 may include an information reporting component 1125, an antenna selection component 1130, a waveform communication component 1135, an SRS resource configuration component 1140, an SRS transmission component 1145, or any combination thereof. Each of these components, or components or subcomponents thereof (e.g., one or more processors, one or more memories), may communicate, directly or indirectly, with one another (e.g., via one or more buses).

The communications manager 1120 may support wireless communications in accordance with examples as disclosed herein. The information reporting component 1125 is capable of, configured to, or operable to support a means for transmitting, to a network entity, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform. The antenna selection component 1130 is capable of, configured to, or operable to support a means for receiving, from the network entity, an indication of a first selection of one or more first antennas of the set of multiple antennas for the first waveform and a second selection of one or more second antennas of the set of multiple antennas for the second waveform based on the information report. The waveform communication component 1135 is capable of, configured to, or operable to support a means for communicating in accordance with the first waveform via at least a first antenna of the one or more first antennas and in accordance with the second waveform via at least a second antenna of the one or more second antennas based on the indication of the first selection and the second selection.

In some examples, the first set of parameters includes a first set of PHR values, each PHR value of the first set of PHR values corresponding to a respective antenna of the set of multiple antennas and being associated with the first waveform. In some examples, the second set of parameters includes a second set of PHR values, each PHR value of the second set of PHR values corresponding to a respective antenna of the set of multiple antennas and being associated with the second waveform.

In some examples, to support transmitting the information report associated with the set of multiple antennas, the information reporting component 1125 is capable of, configured to, or operable to support a means for transmitting a set of multiple per-antenna per-waveform PHR values, where the set of multiple parameters includes the set of multiple per-antenna per-waveform PHR values.

In some examples, to support transmitting the information report associated with the set of multiple antennas, the information reporting component 1125 is capable of, configured to, or operable to support a means for transmitting a set of multiple per-antenna per-channel PHR values, where the UE is capable of communication via a set of multiple channels, where each channel of the set of multiple channels is associated with a respective waveform of a set of multiple waveforms including the first waveform and the second waveform, and where the set of multiple parameters includes the set of multiple per-antenna per-channel PHR values.

In some examples, to support transmitting the information report associated with the set of multiple antennas, the information reporting component 1125 is capable of, configured to, or operable to support a means for transmitting a set of multiple per-antenna per-reference signal PHR values, where the UE is capable of transmission of a set of multiple reference signals, where each reference signal of the set of multiple reference signals is associated with a respective waveform of a set of multiple waveforms including the first waveform and the second waveform, and where the set of multiple parameters includes the set of multiple per-antenna per-reference signal PHR values.

In some examples, to support transmitting the information report associated with the set of multiple antennas, the information reporting component 1125 is capable of, configured to, or operable to support a means for transmitting a set of multiple per-antenna per-usage PHR values, where the UE is capable of communication in accordance with a set of multiple usages, where each usage of the set of multiple usages is associated with a respective waveform of a set of multiple waveforms including the first waveform and the second waveform, and where the set of multiple parameters includes the set of multiple per-antenna per-usage PHR values.

In some examples, the SRS resource configuration component 1140 is capable of, configured to, or operable to support a means for receiving, from the network entity, control signaling indicative of a set of multiple SRS resource configurations, where the set of multiple SRS resource configurations includes a first SRS resource configuration associated with the first waveform and a second SRS resource configuration associated with the second waveform. In some examples, the SRS transmission component 1145 is capable of, configured to, or operable to support a means for transmitting, to the network entity via each antenna of at least a subset of the set of multiple antennas of the UE, a first respective set of SRSs in accordance with the first SRS resource configuration and a second respective set of SRSs in accordance with the second SRS resource configuration.

In some examples, the indication of the first selection and the second selection is based on transmission of the first respective set of SRSs and the second respective set of SRSs via each antenna of at least the subset of the set of multiple antennas of the UE.

In some examples, to support receiving the indication of the first selection and the second selection, the antenna selection component 1130 is capable of, configured to, or operable to support a means for receiving per-waveform antenna selection results.

In some examples, to support receiving the indication of the first selection and the second selection, the antenna selection component 1130 is capable of, configured to, or operable to support a means for receiving per-channel antenna selection results, where the UE is capable of communication via a set of multiple channels, and where each channel of the set of multiple channels is associated with a respective waveform of a set of multiple waveforms including the first waveform and the second waveform.

In some examples, to support receiving the indication of the first selection and the second selection, the antenna selection component 1130 is capable of, configured to, or operable to support a means for receiving per-reference signal antenna selection results, where the UE is capable of transmission of a set of multiple reference signals, and where each reference signal of the set of multiple reference signals is associated with a respective waveform of a set of multiple waveforms including the first waveform and the second waveform.

In some examples, to support receiving the indication of the first selection and the second selection, the antenna selection component 1130 is capable of, configured to, or operable to support a means for receiving per-usage antenna selection results, where the UE is capable of communication in accordance with a set of multiple usages, and where each usage of the set of multiple usages is associated with a respective waveform of a set of multiple waveforms including the first waveform and the second waveform.

In some examples, the first selection of the one or more first antennas of the set of multiple antennas for the first waveform and the second selection of the one or more second antennas of the set of multiple antennas for the second waveform are further in accordance with one or both of a per-rank antenna selection and a per-codebook antenna selection.

In some examples, reception of the indication of the first selection and the second selection is in accordance with a waveform specific closed-loop antenna selection scheme between the UE and the network entity.

Figure 12:
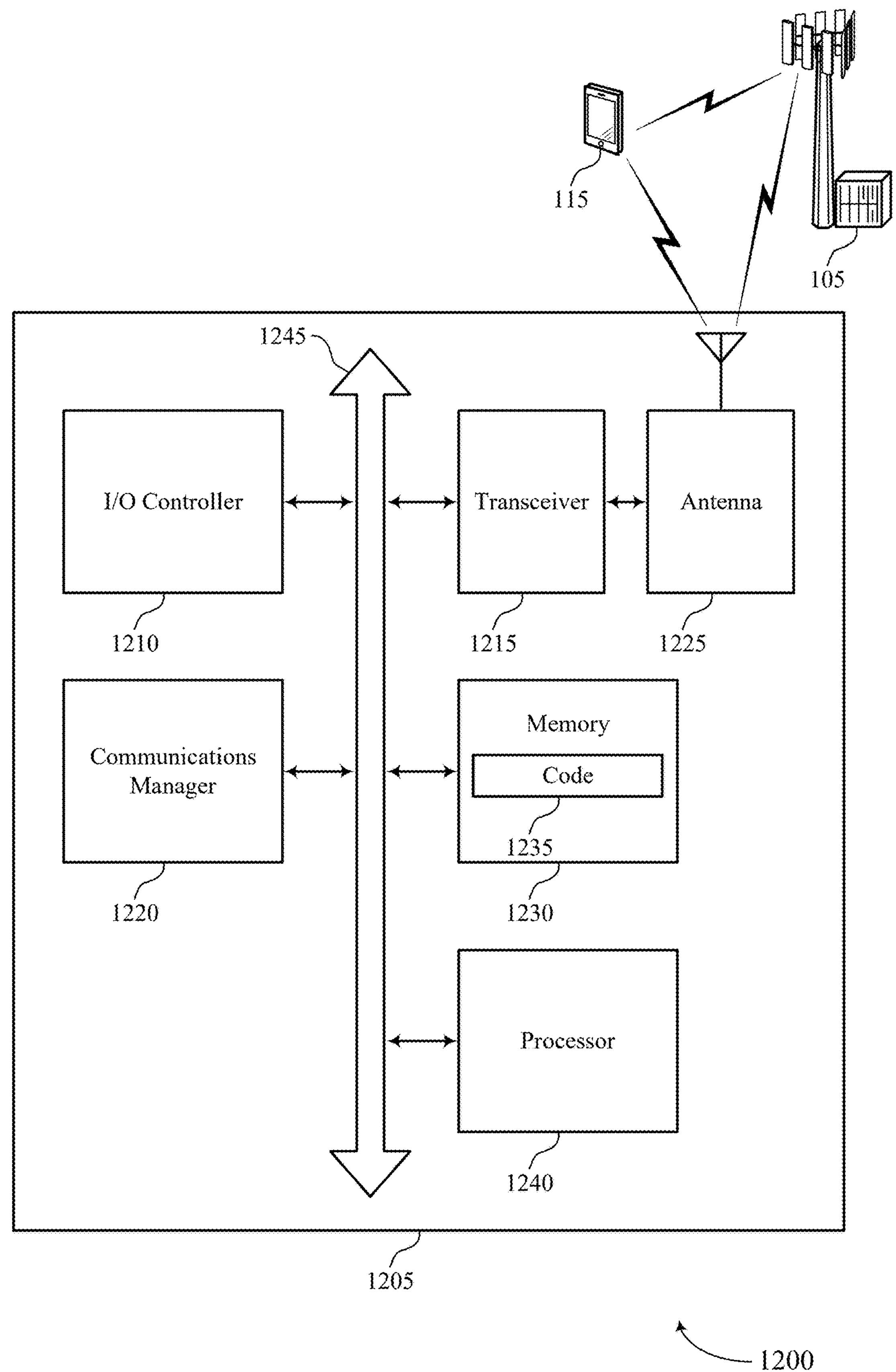
FIG. 12 shows a diagram of a system including a device that supports waveform specific closed-loop antenna selection in accordance with one or more aspects of the present disclosure.

FIG. 12 shows a diagram of a system 1200 including a device 1205 that supports waveform specific closed-loop antenna selection in accordance with one or more aspects of the present disclosure. The device 1205 may be an example of or include components of a device 905, a device 1005, or a UE 115 as described herein. The device 1205 may communicate (e.g., wirelessly) with one or more other devices (e.g., network entities 105, UEs 115, or a combination thereof). The device 1205 may include components for bi-directional voice and data communications including components for transmitting and receiving communications, such as a communications manager 1220, an input/output (I/O) controller, such as an I/O controller 1210, a transceiver 1215, one or more antennas 1225, at least one memory 1230, code 1235, and at least one processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of one or more processors, such as the at least one processor 1240. In some cases, a user may interact with the device 1205 via the I/O controller 1210 or via hardware components controlled by the I/O controller 1210.

In some cases, the device 1205 may include a single antenna. However, in some other cases, the device 1205 may have more than one antenna, which may be capable of concurrently transmitting or receiving multiple wireless transmissions. The transceiver 1215 may communicate bi-directionally via the one or more antennas 1225 using wired or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The at least one memory 1230 may include random access memory (RAM) and read-only memory (ROM). The at least one memory 1230 may store computer-readable, computer-executable, or processor-executable code, such as the code 1235. The code 1235 may include instructions that, when executed by the at least one processor 1240, cause the device 1205 to perform various functions described herein. The code 1235 may be stored in a non-transitory computer-readable medium such as system memory or another type of memory. In some cases, the code 1235 may not be directly executable by the at least one processor 1240 but may cause a computer (e.g., when compiled and executed) to perform functions described herein. In some cases, the at least one memory 1230 may include, among other things, a basic I/O system (BIOS) which may control basic hardware or software operation such as the interaction with peripheral components or devices.

The at least one processor 1240 may include one or more intelligent hardware devices (e.g., one or more general-purpose processors, one or more DSPs, one or more CPUs, one or more GPUs, one or more NPUs (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1240 may be configured to operate a memory array using a memory controller. In some other cases, a memory controller may be integrated into the at least one processor 1240. The at least one processor 1240 may be configured to execute computer-readable instructions stored in a memory (e.g., the at least one memory 1230) to cause the device 1205 to perform various functions (e.g., functions or tasks supporting waveform specific closed-loop antenna selection). For example, the device 1205 or a component of the device 1205 may include at least one processor 1240 and at least one memory 1230 coupled with or to the at least one processor 1240, the at least one processor 1240 and the at least one memory 1230 configured to perform various functions described herein.

In some examples, the at least one processor 1240 may include multiple processors and the at least one memory 1230 may include multiple memories. One or more of the multiple processors may be coupled with one or more of the multiple memories, which may, individually or collectively, be configured to perform various functions described herein. In some examples, the at least one processor 1240 may be a component of a processing system, which may refer to a system (such as a series) of machines, circuitry (including, for example, one or both of processor circuitry (which may include the at least one processor 1240) and memory circuitry (which may include the at least one memory 1230)), or components, that receives or obtains inputs and processes the inputs to produce, generate, or obtain a set of outputs. The processing system may be configured to perform one or more of the functions described herein. For example, the at least one processor 1240 or a processing system including the at least one processor 1240 may be configured to, configurable to, or operable to cause the device 1205 to perform one or more of the functions described herein. Further, as described herein, being "configured to," being "configurable to," and being "operable to" may be used interchangeably and may be associated with a capability, when executing code 1235 (e.g., processor-executable code) stored in the at least one memory 1230 or otherwise, to perform one or more of the functions described herein.

The communications manager 1220 may support wireless communications in accordance with examples as disclosed herein. For example, the communications manager 1220 is capable of, configured to, or operable to support a means for transmitting, to a network entity, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform. The communications manager 1220 is capable of, configured to, or operable to support a means for receiving, from the network entity, an indication of a first selection of one or more first antennas of the set of multiple antennas for the first waveform and a second selection of one or more second antennas of the set of multiple antennas for the second waveform based on the information report. The communications manager 1220 is capable of, configured to, or operable to support a means for communicating in accordance with the first waveform via at least a first antenna of the one or more first antennas and in accordance with the second waveform via at least a second antenna of the one or more second antennas based on the indication of the first selection and the second selection.

By including or configuring the communications manager 1220 in accordance with examples as described herein, the device 1205 may support techniques for improved communication reliability, reduced latency, more efficient utilization of communication resources, improved coordination between devices, longer battery life, and improved utilization of processing and other hardware (e.g., antenna) capabilities.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the at least one processor 1240, the at least one memory 1230, the code 1235, or any combination thereof. For example, the code 1235 may include instructions executable by the at least one processor 1240 to cause the device 1205 to perform various aspects of waveform specific closed-loop antenna selection as described herein, or the at least one processor 1240 and the at least one memory 1230 may be otherwise configured to, individually or collectively, perform or support such operations.

Figure 13:
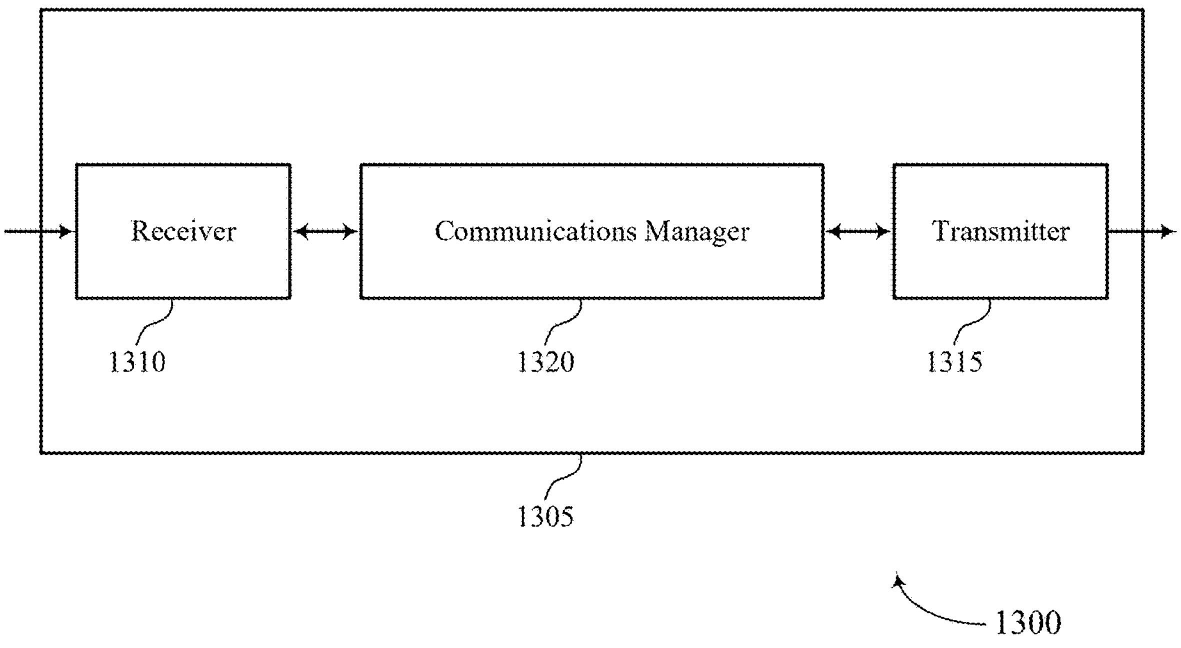
FIGS. 13 and 14 show diagrams of devices that support waveform specific closed-loop antenna selection in accordance with one or more aspects of the present disclosure.

FIG. 13 shows a diagram 1300 of a device 1305 that supports waveform specific closed-loop antenna selection in accordance with one or more aspects of the present disclosure. The device 1305 may be an example of aspects of a network entity 105 as described herein. The device 1305 may include a receiver 1310, a transmitter 1315, and a communications manager 1320. The device 1305, or one or more components of the device 1305 (e.g., the receiver 1310, the transmitter 1315, the communications manager 1320), may include at least one processor, which may be coupled with at least one memory, to, individually or collectively, support or enable the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations or components thereof may be examples of means for performing various aspects of waveform specific closed-loop antenna selection as described herein. For example, the communications manager 1320, the receiver 1310, the transmitter 1315, or various combinations or components thereof may be capable of performing one or more of the functions described herein.

In some examples, the communications manager 1320, the receiver 1310, the transmitter 1315, or various combinations or components thereof may be implemented in hardware (e.g., in communications management circuitry). The hardware may include at least one of a processor, a DSP, a CPU, an NPU, a GPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1320, the receiver 1310, the transmitter 1315, or various combinations or components thereof may be implemented in code (e.g., as communications management software or firmware) executed by at least one processor (e.g., referred to as a processor-executable code). If implemented in code executed by at least one processor, the functions of the communications manager 1320, the receiver 1310, the transmitter 1315, or various combinations or components thereof may be performed by a general-purpose processor, a DSP, a CPU, an NPU, a GPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. For example, the communications manager 1320 is capable of, configured to, or operable to support a means for receiving, from a UE, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform. The communications manager 1320 is capable of, configured to, or operable to support a means for transmitting, to the UE, an indication of a first selection of one or more first antennas of the set of multiple antennas for the first waveform and a second selection of one or more second antennas of the set of multiple antennas for the second waveform based on the information report. The communications manager 1320 is capable of, configured to, or operable to support a means for communicating with the UE in accordance with the first waveform via at least a first antenna of the one or more first antennas and in accordance with the second waveform via at least a second antenna of the one or more second antennas based on the indication of the first selection and the second selection.

By including or configuring the communications manager 1320 in accordance with examples as described herein, the device 1305 (e.g., at least one processor controlling or otherwise coupled with the receiver 1310, the transmitter 1315, the communications manager 1320, or a combination thereof) may support techniques for reduced power consumption, more efficient utilization of communication and hardware resources, and greater reliability by supporting per-waveform antenna selection.

Figure 14:
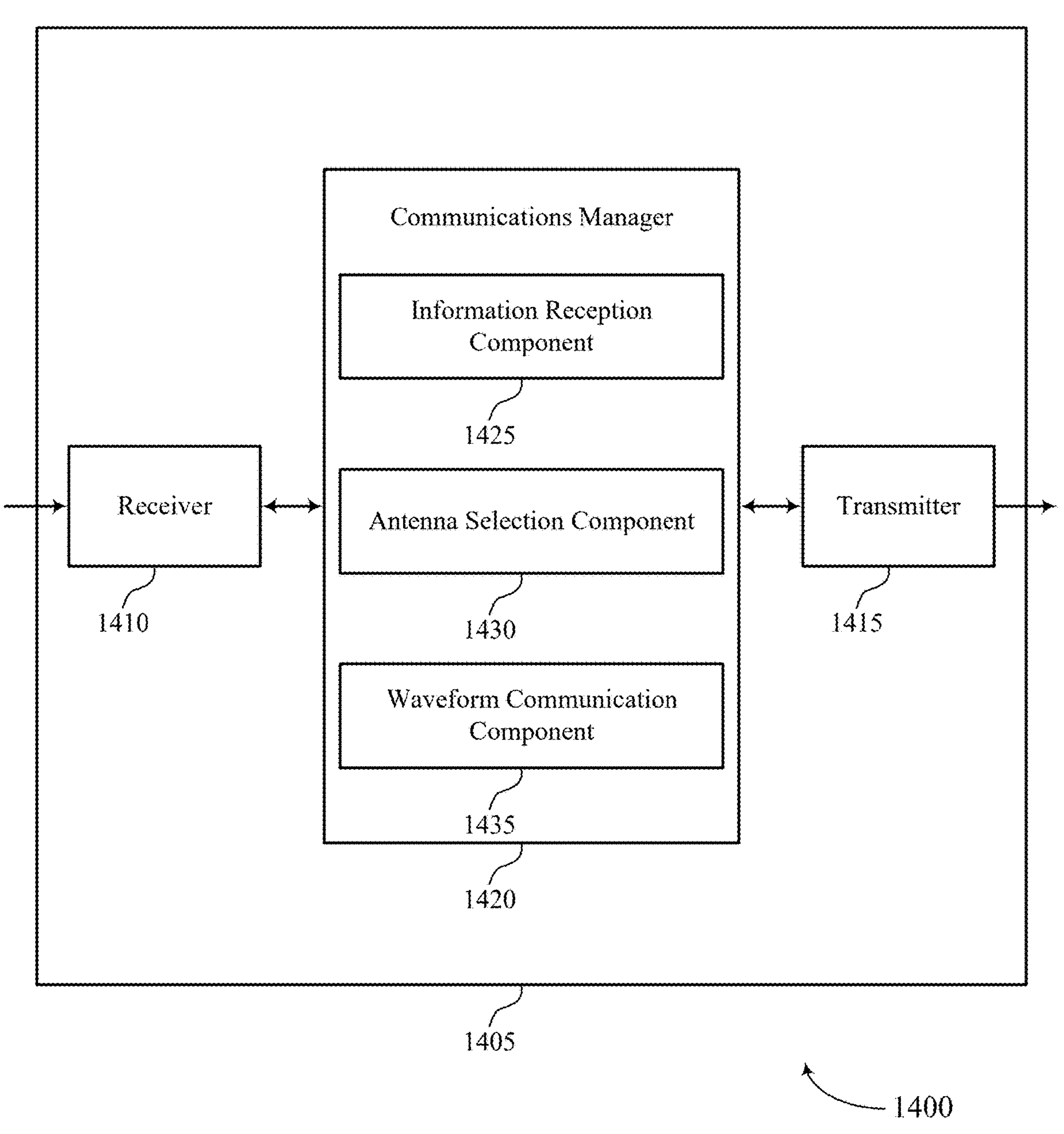

FIG. 14 shows a diagram 1400 of a device 1405 that supports waveform specific closed-loop antenna selection in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405, or one or more components of the device 1405 (e.g., the receiver 1410, the transmitter 1415, the communications manager 1420), may include at least one processor, which may be coupled with at least one memory, to support the described techniques. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of waveform specific closed-loop antenna selection as described herein. For example, the communications manager 1420 may include an information reception component 1425, an antenna selection component 1430, a waveform communication component 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications in accordance with examples as disclosed herein. The information reception component 1425 is capable of, configured to, or operable to support a means for receiving, from a UE, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform. The antenna selection component 1430 is capable of, configured to, or operable to support a means for transmitting, to the UE, an indication of a first selection of one or more first antennas of the set of multiple antennas for the first waveform and a second selection of one or more second antennas of the set of multiple antennas for the second waveform based on the information report. The waveform communication component 1435 is capable of, configured to, or operable to support a means for communicating with the UE in accordance with the first waveform via at least a first antenna of the one or more first antennas and in accordance with the second waveform via at least a second antenna of the one or more second antennas based on the indication of the first selection and the second selection.

Figure 15:
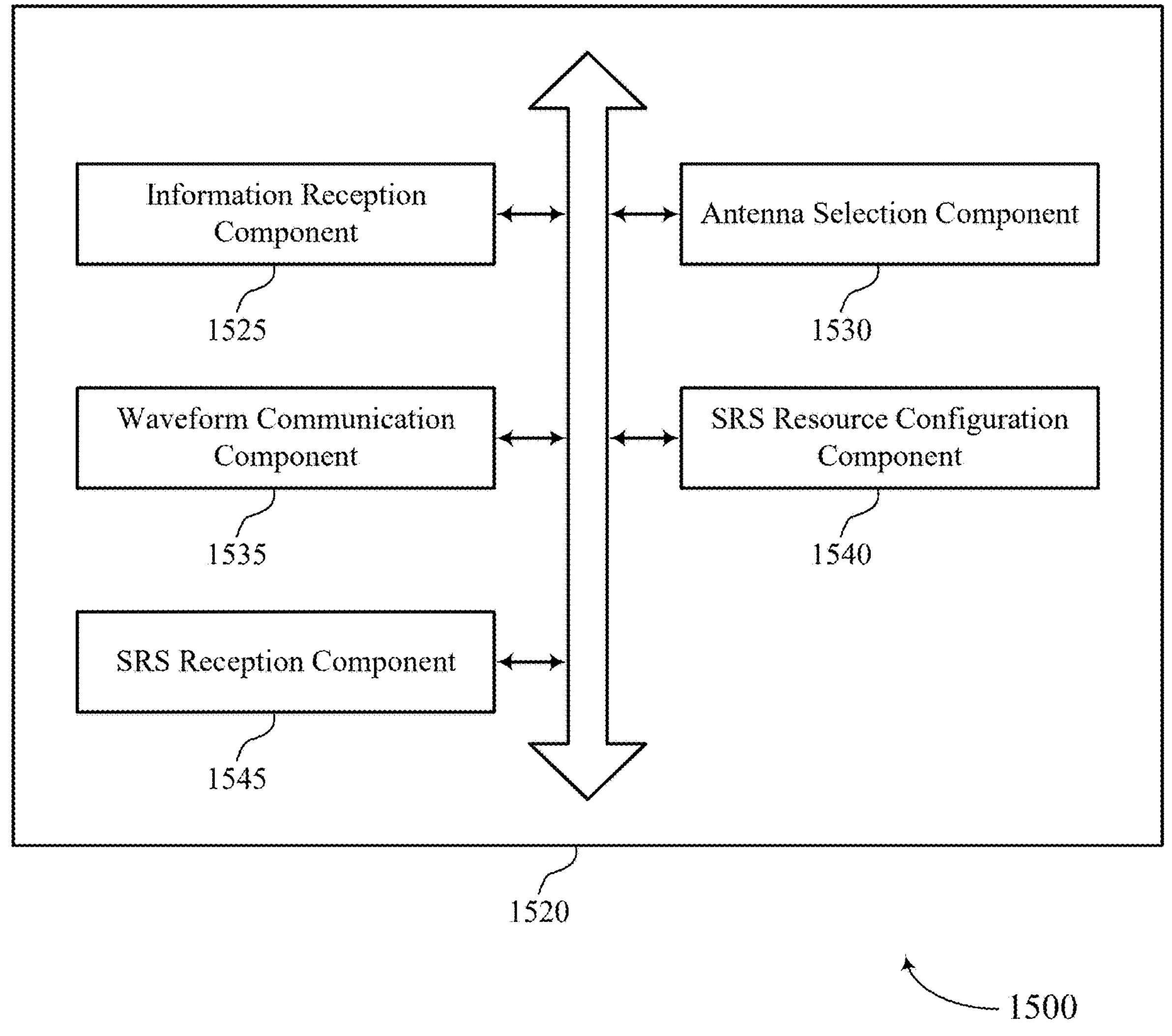
FIG. 15 shows a diagram of a communications manager that supports waveform specific closed-loop antenna selection in accordance with one or more aspects of the present disclosure.

FIG. 15 shows a diagram 1500 of a communications manager 1520 that supports waveform specific closed-loop antenna selection in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of waveform specific closed-loop antenna selection as described herein. For example, the communications manager 1520 may include an information reception component 1525, an antenna selection component 1530, a waveform communication component 1535, an SRS resource configuration component 1540, an SRS reception component 1545, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communications in accordance with examples as disclosed herein. The information reception component 1525 is capable of, configured to, or operable to support a means for receiving, from a UE, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform. The antenna selection component 1530 is capable of, configured to, or operable to support a means for transmitting, to the UE, an indication of a first selection of one or more first antennas of the set of multiple antennas for the first waveform and a second selection of one or more second antennas of the set of multiple antennas for the second waveform based on the information report. The waveform communication component 1535 is capable of, configured to, or operable to support a means for communicating with the UE in accordance with the first waveform via at least a first antenna of the one or more first antennas and in accordance with the second waveform via at least a second antenna of the one or more second antennas based on the indication of the first selection and the second selection.

In some examples, the first set of parameters includes a first set of PHR values, each PHR value of the first set of PHR values corresponding to a respective antenna of the set of multiple antennas and being associated with the first waveform. In some examples, the second set of parameters includes a second set of PHR values, each PHR value of the second set of PHR values corresponding to a respective antenna of the set of multiple antennas and being associated with the second waveform.

In some examples, to support receiving the information report associated with the set of multiple antennas, the information reception component 1525 is capable of, configured to, or operable to support a means for receiving a set of multiple per-antenna per-waveform PHR values, where the set of multiple parameters includes the set of multiple per-antenna per-waveform PHR values.

In some examples, to support receiving the information report associated with the set of multiple antennas, the information reception component 1525 is capable of, configured to, or operable to support a means for receiving a set of multiple per-antenna per-channel PHR values, where the UE is capable of communication via a set of multiple channels, where each channel of the set of multiple channels is associated with a respective waveform of a set of multiple waveforms including the first waveform and the second waveform, and where the set of multiple parameters includes the set of multiple per-antenna per-channel PHR values.

In some examples, to support receiving the information report associated with the set of multiple antennas, the information reception component 1525 is capable of, configured to, or operable to support a means for receiving a set of multiple per-antenna per-reference signal PHR values, where the UE is capable of transmission of a set of multiple reference signals, where each reference signal of the set of multiple reference signals is associated with a respective waveform of a set of multiple waveforms including the first waveform and the second waveform, and where the set of multiple parameters includes the set of multiple per-antenna per-reference signal PHR values.

In some examples, to support receiving the information report associated with the set of multiple antennas, the information reception component 1525 is capable of, configured to, or operable to support a means for receiving a set of multiple per-antenna per-usage PHR values, where the UE is capable of communication in accordance with a set of multiple usages, where each usage of the set of multiple usages is associated with a respective waveform of a set of multiple waveforms including the first waveform and the second waveform, and where the set of multiple parameters includes the set of multiple per-antenna per-usage PHR values.

In some examples, the SRS resource configuration component 1540 is capable of, configured to, or operable to support a means for transmitting, to the UE, control signaling indicative of a set of multiple SRS resource configurations, where the set of multiple SRS resource configurations includes a first SRS resource configuration associated with the first waveform and a second SRS resource configuration associated with the second waveform. In some examples, the SRS reception component 1545 is capable of, configured to, or operable to support a means for receiving, from the UE via each antenna of at least a subset of the set of multiple antennas of the UE, a first respective set of SRSs in accordance with the first SRS resource configuration and a second respective set of SRSs in accordance with the second SRS resource configuration.

In some examples, the indication of the first selection and the second selection is based on reception of the first respective set of SRSs and the second respective set of SRSs via each antenna of at least the subset of the set of multiple antennas of the UE.

In some examples, to support transmitting the indication of the first selection and the second selection, the antenna selection component 1530 is capable of, configured to, or operable to support a means for transmitting per-waveform antenna selection results.

In some examples, to support transmitting the indication of the first selection and the second selection, the antenna selection component 1530 is capable of, configured to, or operable to support a means for transmitting per-channel antenna selection results, where the UE is capable of communication via a set of multiple channels, and where each channel of the set of multiple channels is associated with a respective waveform of a set of multiple waveforms including the first waveform and the second waveform.

In some examples, to support transmitting the indication of the first selection and the second selection, the antenna selection component 1530 is capable of, configured to, or operable to support a means for transmitting per-reference signal antenna selection results, where the UE is capable of transmission of a set of multiple reference signals, and where each reference signal of the set of multiple reference signals is associated with a respective waveform of a set of multiple waveforms including the first waveform and the second waveform.

In some examples, to support transmitting the indication of the first selection and the second selection, the antenna selection component 1530 is capable of, configured to, or operable to support a means for transmitting per-usage antenna selection results, where the UE is capable of communication in accordance with a set of multiple usages, and where each usage of the set of multiple usages is associated with a respective waveform of a set of multiple waveforms including the first waveform and the second waveform.

In some examples, the first selection of the one or more first antennas of the set of multiple antennas for the first waveform and the second selection of the one or more second antennas of the set of multiple antennas for the second waveform are further in accordance with one or both of a per-rank antenna selection and a per-codebook antenna selection.

In some examples, transmission of the indication of the first selection and the second selection is in accordance with a waveform specific closed loop antenna selection scheme between the UE and the network entity.

Figure 16:
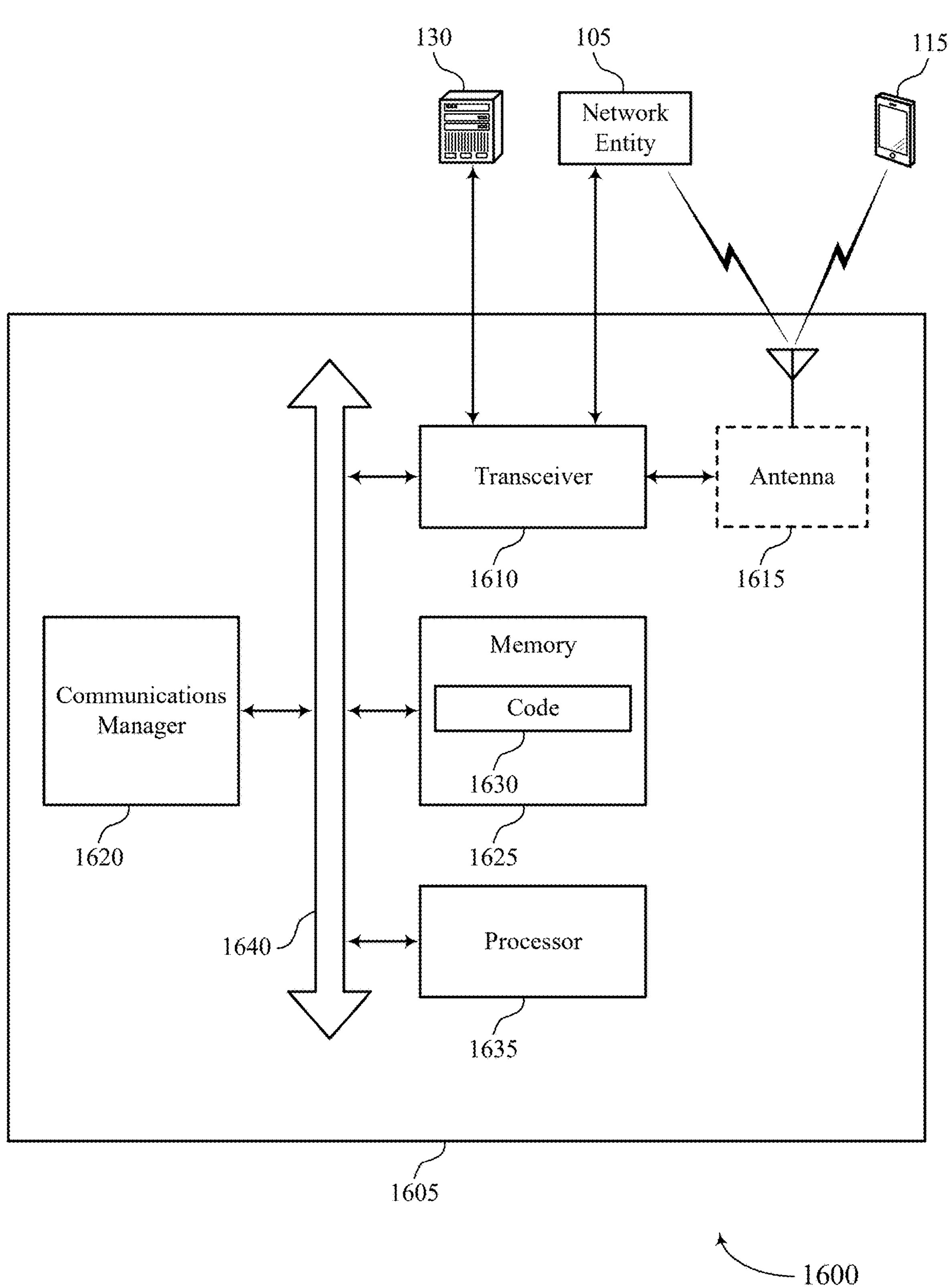
FIG. 16 shows a diagram of a system including a device that supports waveform specific closed-loop antenna selection in accordance with one or more aspects of the present disclosure.

FIG. 16 shows a diagram of a system 1600 including a device 1605 that supports waveform specific closed-loop antenna selection in accordance with one or more aspects of the present disclosure. The device 1605 may be an example of or include components of a device 1305, a device 1405, or a network entity 105 as described herein. The device 1605 may communicate with other network devices or network equipment such as one or more of the network entities 105, UEs 115, or any combination thereof. The communications may include communications over one or more wired interfaces, over one or more wireless interfaces, or any combination thereof. The device 1605 may include components that support outputting and obtaining communications, such as a communications manager 1620, a transceiver 1610, one or more antennas 1615, at least one memory 1625, code 1630, and at least one processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or one or more memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or one or more memory components (e.g., the at least one processor 1635, the at least one memory 1625, or both), may be included in a chip or chip assembly that is installed in the device 1605. In some examples, the transceiver 1610 may be operable to support communications via one or more communications links (e.g., communication link(s) 125, backhaul communication link(s) 120, a midhaul communication link 162, a fronthaul communication link 168).

The at least one memory 1625 may include RAM, ROM, or any combination thereof. The at least one memory 1625 may store computer-readable, computer-executable, or processor-executable code, such as the code 1630. The code 1630 may include instructions that, when executed by one or more of the at least one processor 1635, cause the device 1605 to perform various functions described herein. The code 1630 may be stored in a non-transitory computer-readable medium such as system memory or another type of memory. In some cases, the code 1630 may not be directly executable by a processor of the at least one processor 1635 but may cause a computer (e.g., when compiled and executed) to perform functions described herein. In some cases, the at least one memory 1625 may include, among other things, a BIOS which may control basic hardware or software operation such as the interaction with peripheral components or devices. In some examples, the at least one processor 1635 may include multiple processors and the at least one memory 1625 may include multiple memories. One or more of the multiple processors may be coupled with one or more of the multiple memories which may, individually or collectively, be configured to perform various functions herein (for example, as part of a processing system).

The at least one processor 1635 may include one or more intelligent hardware devices (e.g., one or more general-purpose processors, one or more DSPs, one or more CPUs, one or more GPUs, one or more NPUs (also referred to as neural network processors or DLPs), one or more microcontrollers, one or more ASICs, one or more FPGAs, one or more programmable logic devices, discrete gate or transistor logic, one or more discrete hardware components, or any combination thereof). In some cases, the at least one processor 1635 may be configured to operate a memory array using a memory controller. In some other cases, a memory controller may be integrated into one or more of the at least one processor 1635. The at least one processor 1635 may be configured to execute computer-readable instructions stored in a memory (e.g., one or more of the at least one memory 1625) to cause the device 1605 to perform various functions (e.g., functions or tasks supporting waveform specific closed-loop antenna selection). For example, the device 1605 or a component of the device 1605 may include at least one processor 1635 and at least one memory 1625 coupled with one or more of the at least one processor 1635, the at least one processor 1635 and the at least one memory 1625 configured to perform various functions described herein. The at least one processor 1635 may be an example of a cloud-computing platform (e.g., one or more physical nodes and supporting software such as operating systems, virtual machines, or container instances) that may host the functions (e.g., by executing code 1630) to perform the functions of the device 1605. The at least one processor 1635 may be any one or more suitable processors capable of executing scripts or instructions of one or more software programs stored in the device 1605 (such as within one or more of the at least one memory 1625).

In some examples, the at least one processor 1635 may include multiple processors and the at least one memory 1625 may include multiple memories. One or more of the multiple processors may be coupled with one or more of the multiple memories, which may, individually or collectively, be configured to perform various functions herein. In some examples, the at least one processor 1635 may be a component of a processing system, which may refer to a system (such as a series) of machines, circuitry (including, for example, one or both of processor circuitry (which may include the at least one processor 1635) and memory circuitry (which may include the at least one memory 1625)), or components, that receives or obtains inputs and processes the inputs to produce, generate, or obtain a set of outputs. The processing system may be configured to perform one or more of the functions described herein. For example, the at least one processor 1635 or a processing system including the at least one processor 1635 may be configured to, configurable to, or operable to cause the device 1605 to perform one or more of the functions described herein. Further, as described herein, being "configured to," being "configurable to," and being "operable to" may be used interchangeably and may be associated with a capability, when executing code stored in the at least one memory 1625 or otherwise, to perform one or more of the functions described herein.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the at least one memory 1625, the code 1630, and the at least one processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with one or more other network entities 105 and may include a controller or scheduler for controlling communications with UEs 115 (e.g., in cooperation with the one or more other network devices). In some examples, the communications manager 1620 may support an X2 interface within an LTE/LTE-A wireless communications network technology to provide communication between network entities 105.

The communications manager 1620 may support wireless communications in accordance with examples as disclosed herein. For example, the communications manager 1620 is capable of, configured to, or operable to support a means for receiving, from a UE, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform. The communications manager 1620 is capable of, configured to, or operable to support a means for transmitting, to the UE, an indication of a first selection of one or more first antennas of the set of multiple antennas for the first waveform and a second selection of one or more second antennas of the set of multiple antennas for the second waveform based on the information report. The communications manager 1620 is capable of, configured to, or operable to support a means for communicating with the UE in accordance with the first waveform via at least a first antenna of the one or more first antennas and in accordance with the second waveform via at least a second antenna of the one or more second antennas based on the indication of the first selection and the second selection.

By including or configuring the communications manager 1620 in accordance with examples as described herein, the device 1605 may support techniques for improved communication reliability, reduced latency, reduced power consumption, more efficient utilization of communication and hardware resources, improved coordination between devices, longer battery life, and improved utilization of processing and other hardware (e.g., antenna) capabilities.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, one or more of the at least one processor 1635, one or more of the at least one memory 1625, the code 1630, or any combination thereof (for example, by a processing system including at least a portion of the at least one processor 1635, the at least one memory 1625, the code 1630, or any combination thereof). For example, the code 1630 may include instructions executable by one or more of the at least one processor 1635 to cause the device 1605 to perform various aspects of waveform specific closed-loop antenna selection as described herein, or the at least one processor 1635 and the at least one memory 1625 may be otherwise configured to, individually or collectively, perform or support such operations.

FIG. 17 shows a flowchart illustrating a method 1700 that supports waveform specific closed-loop antenna selection in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include transmitting, to a network entity, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform. The operations of 1705 may be performed in accordance with examples as disclosed herein. In some examples, aspects of the operations of 1705 may be performed by an information reporting component 1125 as described with reference to FIG. 11.

At 1710, the method may include receiving, from the network entity, an indication of a first selection of one or more first antennas of the set of multiple antennas for the first waveform and a second selection of one or more second antennas of the set of multiple antennas for the second waveform based on the information report. The operations of 1710 may be performed in accordance with examples as disclosed herein. In some examples, aspects of the operations of 1710 may be performed by an antenna selection component 1130 as described with reference to FIG. 11.

At 1715, the method may include communicating in accordance with the first waveform via at least a first antenna of the one or more first antennas and in accordance with the second waveform via at least a second antenna of the one or more second antennas based on the indication of the first selection and the second selection. The operations of 1715 may be performed in accordance with examples as disclosed herein. In some examples, aspects of the operations of 1715 may be performed by a waveform communication component 1135 as described with reference to FIG. 11.

FIG. 18 shows a flowchart illustrating a method 1800 that supports waveform specific closed-loop antenna selection in accordance with one or more aspects of the present disclosure. The operations of the method 1800 may be implemented by a network entity or its components as described herein. For example, the operations of the method 1800 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from a UE, an information report associated with a set of multiple antennas of the UE, where the information report includes a set of multiple parameters, and where the set of multiple parameters includes a first set of parameters associated with the set of multiple antennas for a first waveform and a second set of parameters associated with the set of multiple antennas for a second waveform. The operations of 1805 may be performed in accordance with examples as disclosed herein. In some examples, aspects of the operations of 1805 may be performed by an information reception component 1525 as described with reference to FIG. 15.

At 1810, the method may include transmitting, to the UE, an indication of a first selection of one or more first antennas of the set of multiple antennas for the first waveform and a second selection of one or more second antennas of the set of multiple antennas for the second waveform based on the information report. The operations of 1810 may be performed in accordance with examples as disclosed herein. In some examples, aspects of the operations of 1810 may be performed by an antenna selection component 1530 as described with reference to FIG. 15.

At 1815, the method may include communicating with the UE in accordance with the first waveform via at least a first antenna of the one or more first antennas and in accordance with the second waveform via at least a second antenna of the one or more second antennas based on the indication of the first selection and the second selection. The operations of 1815 may be performed in accordance with examples as disclosed herein. In some examples, aspects of the operations of 1815 may be performed by a waveform communication component 1535 as described with reference to FIG. 15.

The following provides an overview of aspects of the present disclosure:

Aspect 1: A method for wireless communications at a UE, comprising: transmitting, to a network entity, an information report associated with a plurality of antennas of the UE, wherein the information report comprises a plurality of parameters, and wherein the plurality of parameters comprises a first set of parameters associated with the plurality of antennas for a first waveform and a second set of parameters associated with the plurality of antennas for a second waveform; receiving, from the network entity, an indication of a first selection of one or more first antennas of the plurality of antennas for the first waveform and a second selection of one or more second antennas of the plurality of antennas for the second waveform based at least in part on the information report; and communicating with the network entity in accordance with the first waveform via at least a first antenna of the one or more first antennas and in accordance with the second waveform via at least a second antenna of the one or more second antennas based at least in part on the indication of the first selection and the second selection.

Aspect 2: The method of aspect 1, wherein the first set of parameters comprises a first set of PHR values, each PHR value of the first set of PHR values corresponding to a respective antenna of the plurality of antennas and being associated with the first waveform; and the second set of parameters comprises a second set of PHR values, each PHR value of the second set of PHR values corresponding to the respective antenna of the plurality of antennas and being associated with the second waveform.

Aspect 3: The method of any of aspects 1-2, wherein transmitting the information report associated with the plurality of antennas comprises: transmitting a plurality of per-antenna per-waveform PHR values, wherein the plurality of parameters comprises the plurality of per-antenna per-waveform PHR values.

Aspect 4: The method of any of aspects 1-3, wherein transmitting the information report associated with the plurality of antennas comprises: transmitting a plurality of per-antenna per-channel PHR values, wherein the UE is capable of communication via a plurality of channels, wherein each channel of the plurality of channels is associated with a respective waveform of a plurality of waveforms comprising the first waveform and the second waveform, and wherein the plurality of parameters comprises the plurality of per-antenna per-channel PHR values.

Aspect 5: The method of any of aspects 1-4, wherein transmitting the information report associated with the plurality of antennas comprises: transmitting a plurality of per-antenna per-reference signal PHR values, wherein the UE is capable of transmission of a plurality of reference signals, wherein each reference signal of the plurality of reference signals is associated with a respective waveform of a plurality of waveforms comprising the first waveform and the second waveform, and wherein the plurality of parameters comprises the plurality of per-antenna per-reference signal PHR values.

Aspect 6: The method of any of aspects 1-5, wherein transmitting the information report associated with the plurality of antennas comprises: transmitting a plurality of per-antenna per-usage PHR values, wherein the UE is capable of communication in accordance with a plurality of usages, wherein each usage of the plurality of usages is associated with a respective waveform of a plurality of waveforms comprising the first waveform and the second waveform, and wherein the plurality of parameters comprises the plurality of per-antenna per-usage PHR values.

Aspect 7: The method of any of aspects 1-6, further comprising: receiving, from the network entity, control signaling indicative of a plurality of SRS resource configurations, wherein the plurality of SRS resource configurations comprises a first SRS resource configuration associated with the first waveform and a second SRS resource configuration associated with the second waveform; and transmitting, to the network entity via each antenna of at least a subset of the plurality of antennas of the UE, a first respective set of SRSs in accordance with the first SRS resource configuration and a second respective set of SRSs in accordance with the second SRS resource configuration.

Aspect 8: The method of aspect 7, wherein the indication of the first selection and the second selection is based at least in part on transmission of the first respective set of SRSs and the second respective set of SRSs via each antenna of at least the subset of the plurality of antennas of the UE.

Aspect 9: The method of any of aspects 1-8, wherein receiving the indication of the first selection and the second selection comprises: receiving per-waveform antenna selection results.

Aspect 10: The method of any of aspects 1-9, wherein receiving the indication of the first selection and the second selection comprises: receiving per-channel antenna selection results, wherein the UE is capable of communication via a plurality of channels, and wherein each channel of the plurality of channels is associated with a respective waveform of a plurality of waveforms comprising the first waveform and the second waveform.

Aspect 11: The method of any of aspects 1-10, wherein receiving the indication of the first selection and the second selection comprises: receiving per-reference signal antenna selection results, wherein the UE is capable of transmission of a plurality of reference signals, and wherein each reference signal of the plurality of reference signals is associated with a respective waveform of a plurality of waveforms comprising the first waveform and the second waveform.

Aspect 12: The method of any of aspects 1-11, wherein receiving the indication of the first selection and the second selection comprises: receiving per-usage antenna selection results, wherein the UE is capable of communication in accordance with a plurality of usages, and wherein each usage of the plurality of usages is associated with a respective waveform of a plurality of waveforms comprising the first waveform and the second waveform.

Aspect 13: The method of any of aspects 1-12, wherein the first selection of the one or more first antennas of the plurality of antennas for the first waveform and the second selection of the one or more second antennas of the plurality of antennas for the second waveform are further in accordance with one or both of a per-rank antenna selection and a per-codebook antenna selection.

Aspect 14: The method of any of aspects 1-13, wherein reception of the indication of the first selection and the second selection is in accordance with a waveform specific closed-loop antenna selection scheme between the UE and the network entity.

Aspect 15: A method for wireless communications at a network entity, comprising: receiving, from a UE, an information report associated with a plurality of antennas of the UE, wherein the information report comprises a plurality of parameters, and wherein the plurality of parameters comprises a first set of parameters associated with the plurality of antennas for a first waveform and a second set of parameters associated with the plurality of antennas for a second waveform; transmitting, to the UE, an indication of a first selection of one or more first antennas of the plurality of antennas for the first waveform and a second selection of one or more second antennas of the plurality of antennas for the second waveform based at least in part on the information report; and communicating with the UE in accordance with the first waveform via at least a first antenna of the one or more first antennas and in accordance with the second waveform via at least a second antenna of the one or more second antennas based at least in part on the indication of the first selection and the second selection.

Aspect 16: The method of aspect 15, wherein the first set of parameters comprises a first set of PHR values, each PHR value of the first set of PHR values corresponding to a respective antenna of the plurality of antennas and being associated with the first waveform; and the second set of parameters comprises a second set of PHR values, each PHR value of the second set of PHR values corresponding to the respective antenna of the plurality of antennas and being associated with the second waveform.

Aspect 17: The method of any of aspects 15-16, wherein receiving the information report associated with the plurality of antennas comprises: receiving a plurality of per-antenna per-waveform PHR values, wherein the plurality of parameters comprises the plurality of per-antenna per-waveform PHR values.

Aspect 18: The method of any of aspects 15-17, wherein receiving the information report associated with the plurality of antennas comprises: receiving a plurality of per-antenna per-channel PHR values, wherein the UE is capable of communication via a plurality of channels, wherein each channel of the plurality of channels is associated with a respective waveform of a plurality of waveforms comprising the first waveform and the second waveform, and wherein the plurality of parameters comprises the plurality of per-antenna per-channel PHR values.

Aspect 19: The method of any of aspects 15-18, wherein receiving the information report associated with the plurality of antennas comprises: receiving a plurality of per-antenna per-reference signal PHR values, wherein the UE is capable of transmission of a plurality of reference signals, wherein each reference signal of the plurality of reference signals is associated with a respective waveform of a plurality of waveforms comprising the first waveform and the second waveform, and wherein the plurality of parameters comprises the plurality of per-antenna per-reference signal PHR values.

Aspect 20: The method of any of aspects 15-19, wherein receiving the information report associated with the plurality of antennas comprises: receiving a plurality of per-antenna per-usage PHR values, wherein the UE is capable of communication in accordance with a plurality of usages, wherein each usage of the plurality of usages is associated with a respective waveform of a plurality of waveforms comprising the first waveform and the second waveform, and wherein the plurality of parameters comprises the plurality of per-antenna per-usage PHR values.

Aspect 21: The method of any of aspects 15-20, further comprising: transmitting, to the UE, control signaling indicative of a plurality of SRS resource configurations, wherein the plurality of SRS resource configurations comprises a first SRS resource configuration associated with the first waveform and a second SRS resource configuration associated with the second waveform; and receiving, from the UE via each antenna of at least a subset of the plurality of antennas of the UE, a first respective set of SRSs in accordance with the first SRS resource configuration and a second respective set of SRSs in accordance with the second SRS resource configuration.

Aspect 22: The method of aspect 21, wherein the indication of the first selection and the second selection is based at least in part on reception of the first respective set of SRSs and the second respective set of SRSs via each antenna of at least the subset of the plurality of antennas of the UE.

Aspect 23: The method of any of aspects 15-22, wherein transmitting the indication of the first selection and the second selection comprises: transmitting per-waveform antenna selection results.

Aspect 24: The method of any of aspects 15-23, wherein transmitting the indication of the first selection and the second selection comprises: transmitting per-channel antenna selection results, wherein the UE is capable of communication via a plurality of channels, and wherein each channel of the plurality of channels is associated with a respective waveform of a plurality of waveforms comprising the first waveform and the second waveform.

Aspect 25: The method of any of aspects 15-24, wherein transmitting the indication of the first selection and the second selection comprises: transmitting per-reference signal antenna selection results, wherein the UE is capable of transmission of a plurality of reference signals, and wherein each reference signal of the plurality of reference signals is associated with a respective waveform of a plurality of waveforms comprising the first waveform and the second waveform.

Aspect 26: The method of any of aspects 15-25, wherein transmitting the indication of the first selection and the second selection comprises: transmitting per-usage antenna selection results, wherein the UE is capable of communication in accordance with a plurality of usages, and wherein each usage of the plurality of usages is associated with a respective waveform of a plurality of waveforms comprising the first waveform and the second waveform.

Aspect 27: The method of any of aspects 15-26, wherein the first selection of the one or more first antennas of the plurality of antennas for the first waveform and the second selection of the one or more second antennas of the plurality of antennas for the second waveform are further in accordance with one or both of a per-rank antenna selection and a per-codebook antenna selection.

Aspect 28: The method of any of aspects 15-27, wherein transmission of the indication of the first selection and the second selection is in accordance with a waveform specific closed loop antenna selection scheme between the UE and the network entity.

Aspect 29: A UE for wireless communications, comprising one or more memories storing processor-executable code, and one or more processors coupled with the one or more memories and individually or collectively operable to execute the code to cause the UE to perform a method of any of aspects 1-14.

Aspect 30: A UE for wireless communications, comprising at least one means for performing a method of any of aspects 1-14.

Aspect 31: A non-transitory computer-readable medium storing code for wireless communications, the code comprising instructions executable by one or more processors to perform a method of any of aspects 1-14.

Aspect 32: A network entity for wireless communications, comprising one or more memories storing processor-executable code, and one or more processors coupled with the one or more memories and individually or collectively operable to execute the code to cause the network entity to perform a method of any of aspects 15-28.

Aspect 33: A network entity for wireless communications, comprising at least one means for performing a method of any of aspects 15-28.

Aspect 34: A non-transitory computer-readable medium storing code for wireless communications, the code comprising instructions executable by one or more processors to perform a method of any of aspects 15-28.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions. Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

transmit, to a network entity, an information report associated with a plurality of antennas of the UE, wherein the information report comprises a plurality of parameters, and wherein the plurality of parameters comprises a first set of parameters associated with the plurality of antennas for a first waveform and a second set of parameters associated with the plurality of antennas for a second waveform;

receive, from the network entity, an indication of a first selection of one or more first antennas of the plurality of antennas for the first waveform and a second selection of one or more second antennas of the plurality of antennas for the second waveform based at least in part on the information report; and communicate in accordance with the first waveform via at least a first antenna of the one or more first antennas and in accordance with the second waveform via at least a second antenna of the one or more second antennas based at least in part on the indication of the first selection and the second selection.

2. The UE of claim 1, wherein:

the first set of parameters comprises a first set of power headroom values, wherein each power headroom value of the first set of power headroom values corresponds to a respective antenna of the plurality of antennas and is associated with the first waveform; and the second set of parameters comprises a second set of power headroom values, wherein each power headroom value of the second set of power headroom values corresponds to the respective antenna of the plurality of antennas and is associated with the second waveform.

3. The UE of claim 1, wherein, to transmit the information report associated with the plurality of antennas, the one or more processors are individually or collectively operable to execute the code to cause the UE to:

transmit a plurality of per-antenna per-waveform power headroom values, wherein the plurality of parameters comprises the plurality of per-antenna per-waveform power headroom values.

4. The UE of claim 1, wherein, to transmit the information report associated with the plurality of antennas, the one or more processors are individually or collectively operable to execute the code to cause the UE to:

transmit a plurality of per-antenna per-channel power headroom values, wherein the UE is capable of communication via a plurality of channels, wherein each channel of the plurality of channels is associated with a respective waveform of a plurality of waveforms that comprises the first waveform and the second waveform, and wherein the plurality of parameters comprises the plurality of per-antenna per-channel power headroom values.

5. The UE of claim 1, wherein, to transmit the information report associated with the plurality of antennas, the one or more processors are individually or collectively operable to execute the code to cause the UE to:

transmit a plurality of per-antenna per-reference signal power headroom values, wherein the UE is capable of transmission of a plurality of reference signals, wherein each reference signal of the plurality of reference signals is associated with a respective waveform of a plurality of waveforms that comprises the first waveform and the second waveform, and wherein the plurality of parameters comprises the plurality of per-antenna per-reference signal power headroom values.

6. The UE of claim 1, wherein, to transmit the information report associated with the plurality of antennas, the one or more processors are individually or collectively operable to execute the code to cause the UE to:

transmit a plurality of per-antenna per-usage power headroom values, wherein the UE is capable of communication in accordance with a plurality of usages, wherein each usage of the plurality of usages is associated with a respective waveform of a plurality of waveforms that comprises the first waveform and the second waveform, and wherein the plurality of parameters comprises the plurality of per-antenna per-usage power headroom values.

7. The UE of claim 1, wherein the one or more processors are individually or collectively further operable to execute the code to cause the UE to:

receive, from the network entity, control signaling indicative of a plurality of sounding reference signal resource configurations, wherein the plurality of sounding reference signal resource configurations comprises a first sounding reference signal resource configuration associated with the first waveform and a second sounding reference signal resource configuration associated with the second waveform; and transmit, to the network entity via each antenna of at least a subset of the plurality of antennas of the UE, a first respective set of sounding reference signals in accordance with the first sounding reference signal resource configuration and a second respective set of sounding reference signals in accordance with the second sounding reference signal resource configuration.

8. The UE of claim 7, wherein the indication of the first selection and the second selection is based at least in part on transmission of the first respective set of sounding reference signals and the second respective set of sounding reference signals via each antenna of at least the subset of the plurality of antennas of the UE.

9. The UE of claim 1, wherein, to receive the indication of the first selection and the second selection, the one or more processors are individually or collectively operable to execute the code to cause the UE to:

receive per-waveform antenna selection results.

10. The UE of claim 1, wherein, to receive the indication of the first selection and the second selection, the one or more processors are individually or collectively operable to execute the code to cause the UE to:

receive per-channel antenna selection results, wherein the UE is capable of communication via a plurality of channels, and wherein each channel of the plurality of channels is associated with a respective waveform of a plurality of waveforms that comprises the first waveform and the second waveform.

11. The UE of claim 1, wherein, to receive the indication of the first selection and the second selection, the one or more processors are individually or collectively operable to execute the code to cause the UE to:

receive per-reference signal antenna selection results, wherein the UE is capable of transmission of a plurality of reference signals, and wherein each reference signal of the plurality of reference signals is associated with a respective waveform of a plurality of waveforms that comprises the first waveform and the second waveform.

12. The UE of claim 1, wherein, to receive the indication of the first selection and the second selection, the one or more processors are individually or collectively operable to execute the code to cause the UE to:

receive per-usage antenna selection results, wherein the UE is capable of communication in accordance with a plurality of usages, and wherein each usage of the plurality of usages is associated with a respective waveform of a plurality of waveforms that comprises the first waveform and the second waveform.

13. The UE of claim 1, wherein the first selection of the one or more first antennas of the plurality of antennas for the first waveform and the second selection of the one or more second antennas of the plurality of antennas for the second waveform are further in accordance with one or both of a per-rank antenna selection and a per-codebook antenna selection.

14. The UE of claim 1, wherein reception of the indication of the first selection and the second selection is in accordance with a waveform specific closed-loop antenna selection scheme between the UE and the network entity.

15. A method for wireless communications at a user equipment (UE), comprising:

transmitting, to a network entity, an information report associated with a plurality of antennas of the UE, wherein the information report comprises a plurality of parameters, and wherein the plurality of parameters comprises a first set of parameters associated with the plurality of antennas for a first waveform and a second set of parameters associated with the plurality of antennas for a second waveform;

receiving, from the network entity, an indication of a first selection of one or more first antennas of the plurality of antennas for the first waveform and a second selection of one or more second antennas of the plurality of antennas for the second waveform based at least in part on the information report; and communicating in accordance with the first waveform via at least a first antenna of the one or more first antennas and in accordance with the second waveform via at least a second antenna of the one or more second antennas based at least in part on the indication of the first selection and the second selection.

16. The method of claim 15, wherein:

the first set of parameters comprises a first set of power headroom values, each power headroom value of the first set of power headroom values corresponding to a respective antenna of the plurality of antennas and being associated with the first waveform; and the second set of parameters comprises a second set of power headroom values, each power headroom value of the second set of power headroom values corresponding to the respective antenna of the plurality of antennas and being associated with the second waveform.

17. The method of claim 15, wherein transmitting the information report associated with the plurality of antennas comprises:

transmitting a plurality of per-antenna per-waveform power headroom values, wherein the plurality of parameters comprises the plurality of per-antenna per-waveform power headroom values.

18. The method of claim 15, wherein transmitting the information report associated with the plurality of antennas comprises:

transmitting a plurality of per-antenna per-channel power headroom values, wherein the UE is capable of communication via a plurality of channels, wherein each channel of the plurality of channels is associated with a respective waveform of a plurality of waveforms comprising the first waveform and the second waveform, and wherein the plurality of parameters comprises the plurality of per-antenna per-channel power headroom values.

19. The method of claim 15, wherein transmitting the information report associated with the plurality of antennas comprises:

transmitting a plurality of per-antenna per-reference signal power headroom values, wherein the UE is capable of transmission of a plurality of reference signals, wherein each reference signal of the plurality of reference signals is associated with a respective waveform of a plurality of waveforms comprising the first waveform and the second waveform, and wherein the plurality of parameters comprises the plurality of per-antenna per-reference signal power headroom values.

20. A user equipment (UE) for wireless communications, comprising:

means for transmitting, to a network entity, an information report associated with a plurality of antennas of the UE, wherein the information report comprises a plurality of parameters, and wherein the plurality of parameters comprises a first set of parameters associated with the plurality of antennas for a first waveform and a second set of parameters associated with the plurality of antennas for a second waveform;

means for receiving, from the network entity, an indication of a first selection of one or more first antennas of the plurality of antennas for the first waveform and a second selection of one or more second antennas of the plurality of antennas for the second waveform based at least in part on the information report; and means for communicating in accordance with the first waveform via at least a first antenna of the one or more first antennas and in accordance with the second waveform via at least a second antenna of the one or more second antennas based at least in part on the indication of the first selection and the second selection.

* * * * *